US012574948B2

(12) United States Patent
Lyu et al.

(10) Patent No.: US 12,574,948 B2
(45) Date of Patent: Mar. 10, 2026

(54) METHOD AND APPARATUS APPLIED TO NODE USED FOR WIRELESS COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/225,613

(22) Filed: Jun. 2, 2025

(65) Prior Publication Data

US 2025/0294599 A1     Sep. 18, 2025

Related U.S. Application Data

(63) Continuation of application No. 18/920,127, filed on Oct. 18, 2024, now Pat. No. 12,324,005, which is a continuation of application No. PCT/CN2023/126481, filed on Oct. 25, 2023.

(51) Int. Cl.
*H04W 72/40*     (2023.01)
*H04W 72/0453*   (2023.01)
*H04W 92/18*     (2009.01)

(52) U.S. Cl.
CPC ....... *H04W 72/40* (2023.01); *H04W 72/0453* (2013.01); *H04W 92/18* (2013.01)

(58) Field of Classification Search
CPC .......................... H04W 72/40; H04W 72/0453
See application file for complete search history.

(56) References Cited

U.S. PATENT DOCUMENTS

| | | | |
|---|---|---|---|
| 2019/0045469 A1 | 2/2019 | Zhang et al. | |
| 2020/0107236 A1* | 4/2020 | Tseng ................. | H04W 72/044 |
| 2020/0245272 A1 | 7/2020 | Hong et al. | |
| 2021/0195543 A1 | 6/2021 | Lee et al. | |
| 2022/0394732 A1 | 12/2022 | Hosseini et al. | |

(Continued)

FOREIGN PATENT DOCUMENTS

| | | |
|---|---|---|
| CN | 112205039 A | 1/2021 |
| CN | 114208313 A | 3/2022 |

(Continued)

OTHER PUBLICATIONS

International Search Report and Written Opinion in International Appln. No. PCT/CN2023/126481, mailed on Jul. 14, 2024, 15 pages (with machine English translation).

(Continued)

*Primary Examiner* — Brian D Nguyen
(74) *Attorney, Agent, or Firm* — Fish & Richardson P.C.

(57)     ABSTRACT

The present application provides a method and an apparatus for wireless communication. An example method includes: respectively performing measurements on all frequencies in a first frequency subset to obtain a plurality of measurement results, determining whether to transmit a sidelink synchronization signal block on one or more frequencies in a first frequency set based on a first parameter and a first threshold, wherein the first parameter is determined based on the plurality of measurement results, and the first frequency subset belongs to the first frequency set.

20 Claims, 5 Drawing Sheets

(56) References Cited

U.S. PATENT DOCUMENTS

| | | | |
|---|---|---|---|
| 2023/0284173 A1 | 9/2023 | Ko | |
| 2023/0362846 A1* | 11/2023 | Dutta | H04W 56/001 |
| 2023/0362851 A1* | 11/2023 | Yang | H04W 56/0015 |
| 2023/0370986 A1* | 11/2023 | Keshavamurthy | |
| | | | H04W 56/0015 |
| 2023/0403740 A1* | 12/2023 | Fouad | H04W 74/0866 |
| 2024/0114470 A1* | 4/2024 | Chen | H04J 3/06 |
| 2024/0114491 A1* | 4/2024 | Farag | H04L 5/0073 |
| 2024/0178968 A1 | 5/2024 | Liu et al. | |
| 2024/0236736 A1* | 7/2024 | Oh | H04L 1/0067 |
| 2024/0365264 A1* | 10/2024 | Du | H04W 40/22 |
| 2024/0388942 A1* | 11/2024 | Jaiswal | H04W 24/10 |
| 2024/0389036 A1 | 11/2024 | Balasubramanian et al. | |
| 2024/0414695 A1 | 12/2024 | Yang et al. | |
| 2025/0048316 A1* | 2/2025 | Dai | H04W 64/00 |
| 2025/0097760 A1* | 3/2025 | Du | H04L 1/1854 |
| 2025/0176044 A1* | 5/2025 | Yoshioka | H04W 72/566 |

FOREIGN PATENT DOCUMENTS

| | | |
|---|---|---|
| CN | 115380581 A | 11/2022 |
| CN | 116261896 A | 6/2023 |
| CN | 116548035 A | 8/2023 |
| CN | 116939799 A | 10/2023 |
| WO | WO 2023065362 A1 | 4/2023 |

OTHER PUBLICATIONS

Office Action in Chinese Appln. No. 202380011757.8, mailed on Aug. 16, 2024, 22 pages (with machine English translation).
Office Action in Chinese Appln. No. 202380011757.8, mailed on Nov. 7, 2024, 29 pages (with machine English translation).

* cited by examiner

| Determine a synchronization reference and a synchronisation carrier frequency | S210 |

| Determine whether to transmit a sidelink synchronization signal and a PSBCH | S220 |

S-SSB period = 16 radio frames (160 ms)

Quantity of S-SSBs in one S-SSB period

Slot offset

☒ S-SSB

First slot of a current group of radio frames

Time interval

First slot of a next group of radio frames t

Respectively perform measurements on all frequencies in a first frequency subset to obtain a plurality of measurement results ⎯S410

FIG. 4

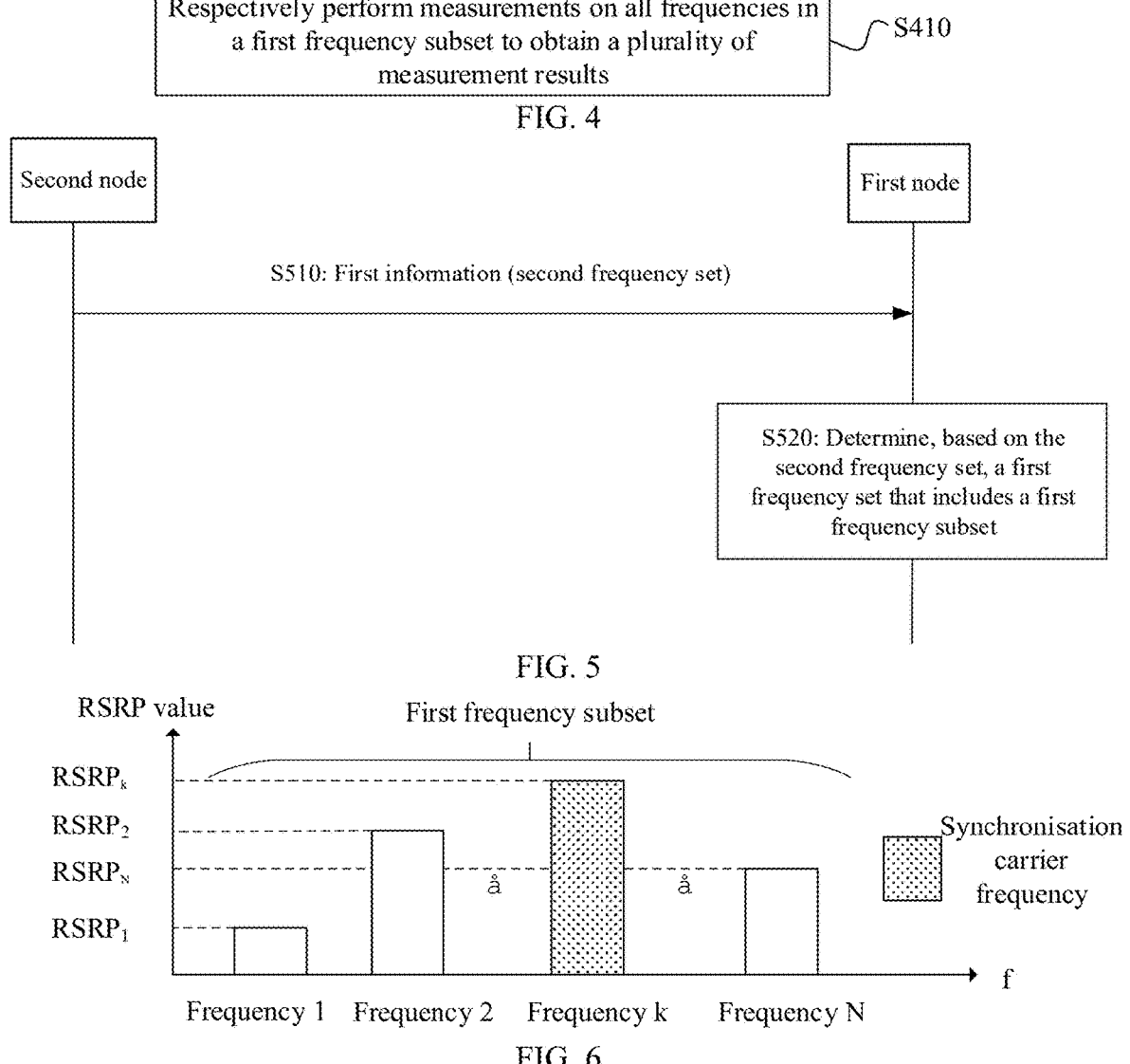

Second node

First node

S510: First information (second frequency set)

S520: Determine, based on the second frequency set, a first frequency set that includes a first frequency subset

FIG. 5

RSRP value    First frequency subset

RSRP$_k$

RSRP$_2$

RSRP$_N$

RSRP$_1$

Synchronisation carrier frequency

Frequency 1    Frequency 2    Frequency k    Frequency N    f

FIG. 6

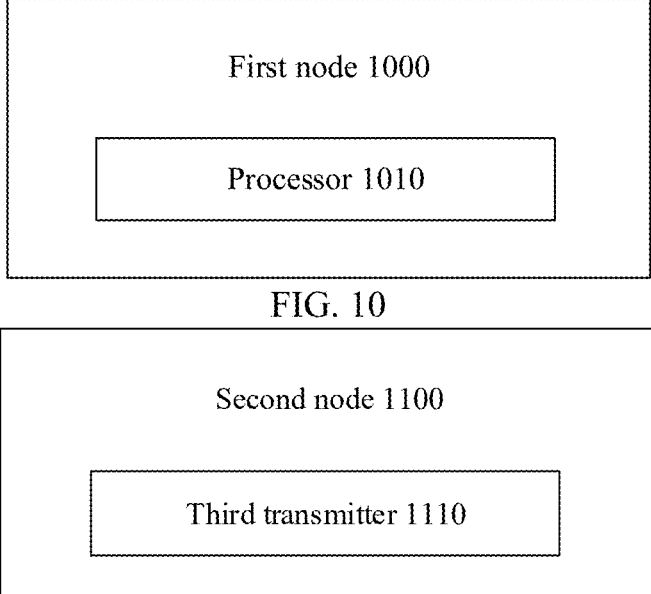
FIG. 10
FIG. 11
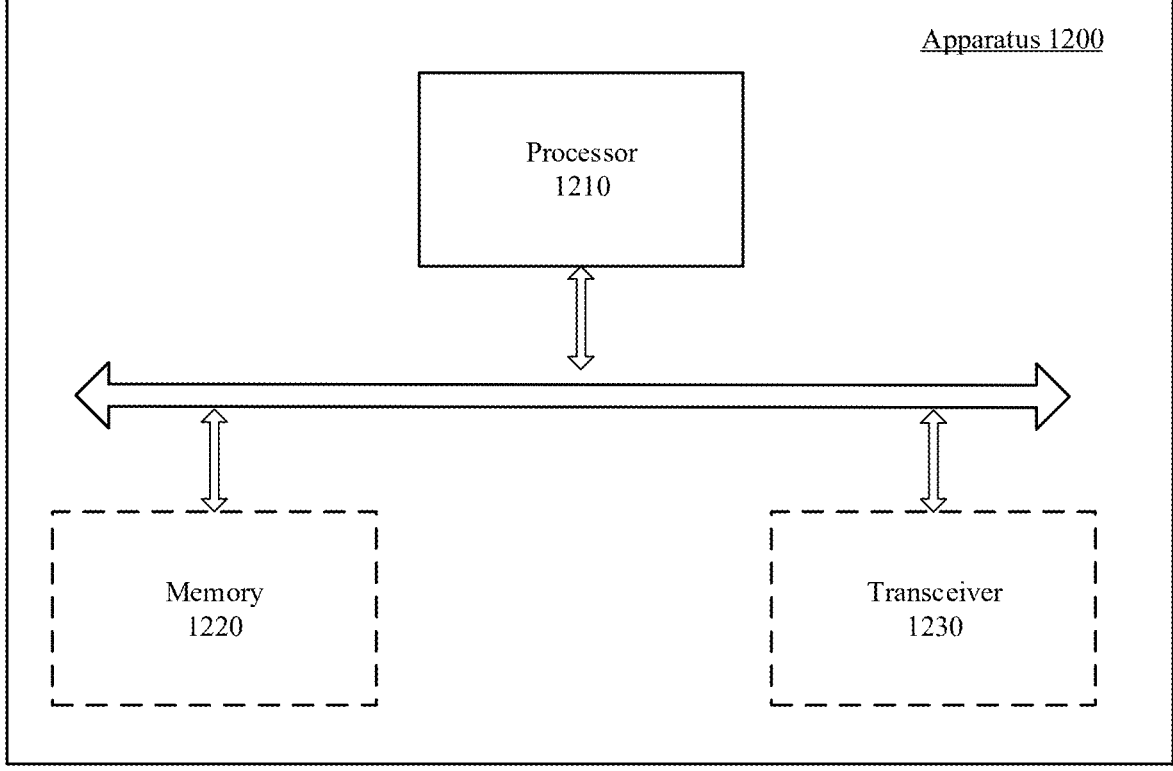
FIG. 12

METHOD AND APPARATUS APPLIED TO NODE USED FOR WIRELESS COMMUNICATION

CROSS-REFERENCE TO RELATED APPLICATIONS

This application is a continuation of U.S. application Ser. No. 18/920,127, filed on Oct. 18, 2024, now U.S. Pat. No. 12,324,005, which is a continuation of International Application No. PCT/CN2023/126481, filed on Oct. 25, 2023. All of the afore-mentioned patent applications are hereby incorporated by reference in their entireties.

TECHNICAL FIELD

The present application relates to the field of communications technologies, and more specifically, to a method and an apparatus applied to a node used for wireless communication.

BACKGROUND

In sidelink (SL) communication, a data transmission rate of a sidelink may be increased by supporting sidelink carrier aggregation (SL CA). In a synchronization process of a conventional SL CA, a terminal device determines, based on a measurement result on a synchronisation carrier, whether to transmit a sidelink synchronization signal on an aggregated carrier.

However, among all aggregated carriers, there may be some carriers with relatively poor coverage, on which skipping transmitting a sidelink synchronization signal may affect SL communication. As a result, it is desired to resolve a problem in synchronization of an SL system introduced with carrier aggregation. In addition, it is also desired to resolve the following technical problems: SL communication cannot be performed on a non-synchronisation carrier; and synchronization coverages are imbalanced on a plurality of carriers of an SL system.

SUMMARY

Embodiments of the present application provide a method and an apparatus applied to a node used for wireless communication. Various aspects in the present application are described below.

According to a first aspect, a method applied to a first node used for wireless communication is provided, including: respectively performing measurements on all frequencies in a first frequency subset to obtain a plurality of measurement results, where a first parameter and a first threshold are used to determine whether to transmit a sidelink synchronization signal block on one or more frequencies in a first frequency set; the plurality of measurement results are used to determine the first parameter; and the first frequency subset belongs to the first frequency set.

According to a second aspect, a method applied to a second node used for wireless communication is provided, including: transmitting first information, where the first information includes a second frequency set; the second frequency set is used by a first node to determine a first frequency set; the first frequency set includes a first frequency subset; a first parameter and a first threshold are used by the first node to determine whether to transmit a sidelink synchronization signal block on one or more frequencies in the first frequency set; the first parameter is determined based on a plurality of measurement results; and the plurality of measurement results are obtained via measurements respectively performed by the first node on all frequencies in the first frequency subset.

According to a third aspect, a first node used for wireless communication is provided, including: a processor, respectively performing measurements on all frequencies in a first frequency subset to obtain a plurality of measurement results, where a first parameter and a first threshold are used to determine whether to transmit a sidelink synchronization signal block on one or more frequencies in a first frequency set; the plurality of measurement results are used to determine the first parameter; and the first frequency subset belongs to the first frequency set.

According to a fourth aspect, a second node used for wireless communication is provided, including: a third transmitter, transmitting first information, where the first information includes a second frequency set; the second frequency set is used by a first node to determine a first frequency set; the first frequency set includes a first frequency subset; a first parameter and a first threshold are used by the first node to determine whether to transmit a sidelink synchronization signal block on one or more frequencies in the first frequency set; the first parameter is determined based on a plurality of measurement results; and the plurality of measurement results are obtained via measurements respectively performed by the first node on all frequencies in the first frequency subset.

According to a fifth aspect, a first node used for wireless communication is provided, including a transceiver, a memory, and a processor, where the memory is configured to store a program; and the processor is configured to invoke the program in the memory, and control the transceiver to receive or transmit a signal, so that the first node performs the method according to the first aspect.

According to a sixth aspect, a second node used for wireless communication is provided, including a transceiver, a memory, and a processor, where the memory is configured to store a program; and the processor is configured to invoke the program in the memory, and control the transceiver to receive or transmit a signal, so that the second node performs the method according to the second aspect.

According to a seventh aspect, an embodiment of the present application provides a communications system, where the system includes the first node and/or the second node described above. In another possible design, the system may further include another device interacting with the first node or the second node in the solution provided in embodiments of the present application.

According to an eighth aspect, an embodiment of the present application provides a computer-readable storage medium. The computer-readable storage medium stores a computer program; and the computer program causes a computer to perform some or all of steps of a method according to the foregoing aspects.

According to a ninth aspect, an embodiment of the present application provides a computer program product. The computer program product includes a non-transitory computer-readable storage medium storing a computer program; and the computer program is operable to cause a computer to perform some or all of steps of a method according to the foregoing aspects. In some implementations, the computer program product may be a software installation package.

According to a tenth aspect, an embodiment of the present application provides a chip. The chip includes a memory and a processor; and the processor may invoke a computer program from the memory and run the computer program, to implement some or all of steps of a method according to the foregoing aspects.

In embodiments of the present application, a first node respectively performs measurements on all frequencies in a first frequency subset, and determines, based on a plurality of obtained measurement results, whether to transmit a sidelink synchronization signal block, where the first frequency subset includes some or all of frequencies that are in the first frequency set and can be used for synchronization. It may be learned that when determining whether to transmit the sidelink synchronization signal block, the first node takes into account measurement results of a plurality of frequencies, instead of performing determining based on only one measurement result on a synchronisation carrier frequency. This effectively resolves a problem of imbalanced synchronization coverages of multiple frequencies in an SL CA operation.

In embodiments of the present application, by the technical solution of determining, by a first node itself based on a plurality of measurement results and a first threshold, whether to transmit a sidelink synchronization signal block, a sidelink synchronization signal block transmitting mechanism excited based on a measurement result is optimized. Further, the technical solution also optimizes a mechanism for determining by a node itself whether to transmit a sidelink synchronization signal block, or optimizes a mechanism for determining by a node itself whether to become a synchronization reference.

In embodiments of the present application, a first node determines, based on a plurality of measurement results, whether to transmit a sidelink synchronization signal block. It may be learned that even if a measurement result of a synchronisation frequency indicates that the sidelink synchronization signal block does not need to be transmitted, SL communication may still be performed on a frequency with relatively weak synchronization coverage by transmitting the sidelink synchronization signal block. Therefore, in embodiments of the present application, the first node may expand an SL communication range even on a frequency with relatively weak synchronization coverage, thereby expanding synchronization coverage ranges of multiple frequencies in an SL CA operation.

BRIEF DESCRIPTION OF THE DRAWINGS

FIG. 4 is a schematic flowchart of a method applied to a first node used for wireless communication according to an embodiment of the present application.

FIG. 5 is a schematic flowchart of a method applied to a second node used for wireless communication according to an embodiment of the present application.

FIG. 6 is a schematic flowchart of a possible implementation of the method shown in FIG. 4.

FIG. 10 is a schematic structural diagram of a first node used for wireless communication according to an embodiment of the present application.

FIG. 11 is a schematic structural diagram of a second node used for wireless communication according to an embodiment of the present application.

FIG. 12 is a schematic structural diagram of an apparatus according to an embodiment of the present application.

DETAILED DESCRIPTION OF THE EMBODIMENTS

The following describes the technical solutions in embodiments of the present application with reference to the accompanying drawings in embodiments of the present application. Apparently, the described embodiments are some rather than all of embodiments of the present application. For embodiments of the present application, all other embodiments obtained by a person of ordinary skill in the art without creative efforts fall within the protection scope of the present application.

Figures 1, 2, 3:
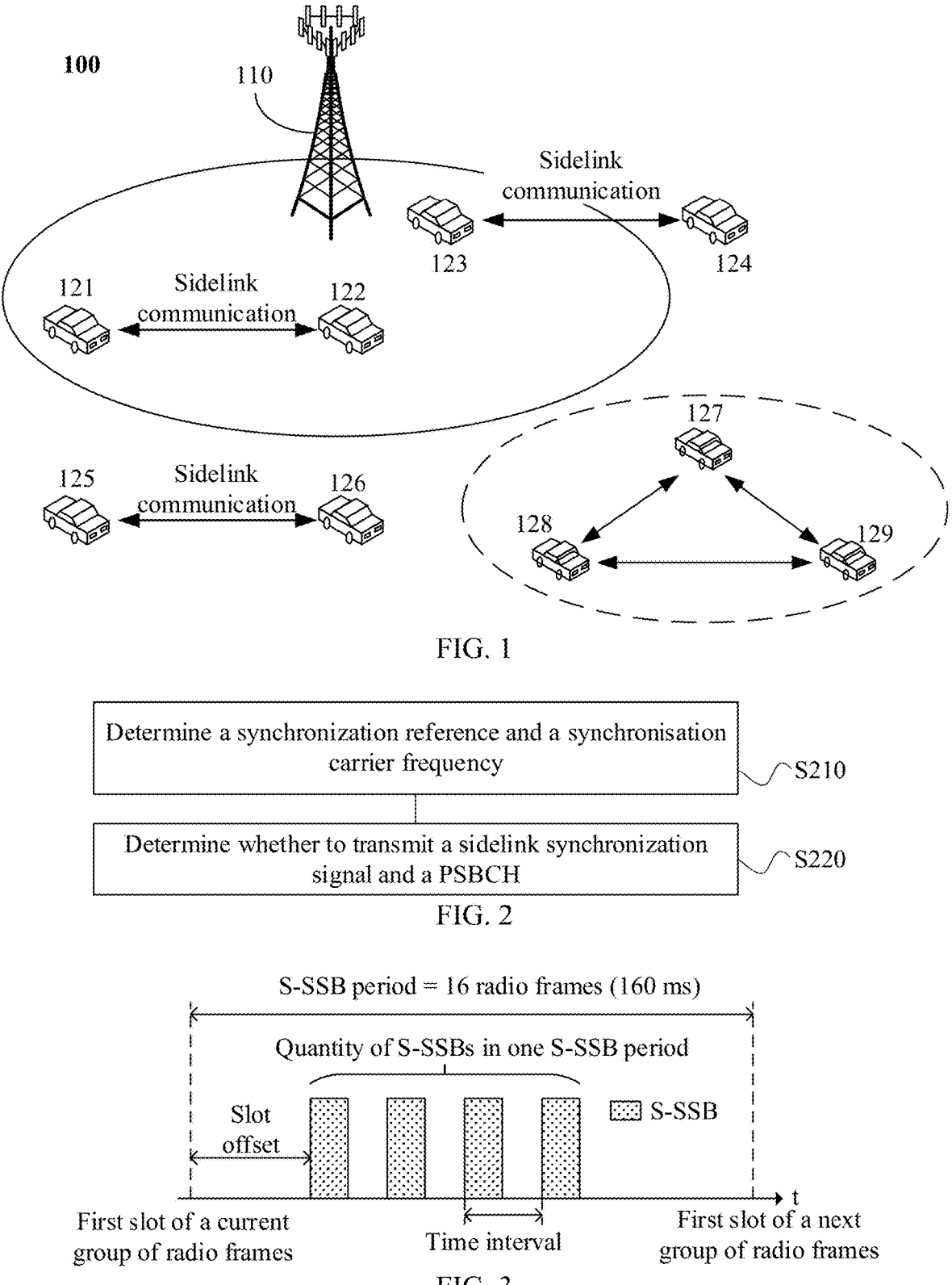
FIG. 1 is an example diagram of a system architecture of a wireless communications system to which embodiments of the present application are applicable.
FIG. 2 is a schematic flowchart of a related SL CA synchronization process.
FIG. 3 is a schematic diagram of distribution of a plurality of S-SSBs in one period.

FIG. 1 is an example diagram of a system architecture of a wireless communications system 100 to which embodiments of the present application are applicable. The wireless communications system 100 may include a network device 110 and user equipments 121 to 129. The network device 110 may provide communication coverage for a specific geographic area, and may communicate with a terminal within the coverage area.

In some implementations, SL communication may be performed between user equipments (UE). SL communication may also represent sidelink communication, proximity based services (ProSe) communication, unilateral communication, side link communication, device-to-device (D2D) communication, or the like.

In other words, a sidelink may be used to transmit sidelink synchronization and/or sidelink broadcast between user equipments. Sidelink synchronization may include a sidelink synchronization signal and/or a sidelink reference signal and/or a sidelink synchronization broadcast channel block. Sidelink broadcast may include a sidelink broadcast channel or a sidelink synchronization broadcast channel block. In some implementations, the sidelink synchronization signal may be, for example, a sidelink primary synchronization signal (S-PSS), a sidelink secondary synchronization signal (S-SSS), or a sidelink synchronization signal/physical sidelink broadcast channel block (S-SS/PSBCH block, S-SSB). In some implementations, the sidelink reference signal may be, for example, a sidelink channel state information reference signal (CSI-RS) or a sidelink demodulation reference signal (DMRS). In some implementations, the sidelink broadcast channel may be, for example, a physical sidelink broadcast channel (PSBCH), a sidelink synchronization signal/physical sidelink broadcast channel block, or a sidelink broadcast channel (SL-BCH).

In other words, sidelink data is transmitted between user equipments over sidelink. The sidelink data may include data and/or control signalling. In some implementations, the sidelink data may be, for example, a physical sidelink control channel (PSCCH), a physical sidelink shared channel (PSSCH), a PSCCH DMRS, a PSSCH DMRS, or a physical sidelink feedback channel (PSFCH).

Several common sidelink communication scenarios are described below with reference to FIG. 1. Sidelink communication may include three scenarios depending on whether user equipments in the sidelink are within coverage of the network device. In scenario 1, the user equipments perform sidelink communication within the coverage of the network device. In scenario 2, some of the user equipments perform sidelink communication within the coverage of the network device. In scenario 3, the user equipments perform sidelink communication outside the coverage of the network device.

As shown in FIG. 1, in scenario 1, user equipments 121 and 122 may communicate with each other over sidelink; and the user equipments 121 and 122 are both within the coverage of the network device 110, or in other words, the user equipments 121 and 122 are both within the coverage of a same network device 110. In this scenario, the network device 110 may transmit configuration signalling to the user equipments 121 and 122; and accordingly, the user equipments 121 and 122 communicate with each other over sidelink based on the configuration signalling.

As shown in FIG. 1, in scenario 2, user equipments 123 and 124 may communicate with each other over sidelink; and the user equipment 123 is within the coverage of the network device 110, while the user equipment 124 is outside the coverage of the network device 110. In this scenario, the user equipment 123 receives configuration information from the network device 110, and communicates over sidelink based on a configuration of the configuration signalling. However, since the user equipment 124 is outside the coverage of the network device 110, the user equipment 124 cannot receive the configuration information from the network device 110. In this case, the user equipment 124 may obtain a configuration of the sidelink communication based on pre-configured (pre-configuration) configuration information and/or the configuration information transmitted by the user equipment 123 within the coverage, so as to communicate with the user equipment 123 over sidelink based on the obtained configuration.

In some cases, the user equipment 123 may transmit the foregoing configuration information to the user equipment 124 through a PSBCH, to configure the user equipment 124 to communicate over sidelink.

As shown in FIG. 1, in scenario 3, user equipments 125 to 129 are all outside the coverage of the network device 110 and cannot communicate with the network device 110. In this case, all the user equipments may perform sidelink communication based on pre-configuration information.

In some cases, the user equipments 127 to 129 outside the coverage of the network device may form a communication cluster; and the user equipments 127 to 129 in the communication cluster may communicate with each other. In addition, the user equipment 127 in the communication cluster may serve as a central control node, also referred to as a cluster header (CH) terminal. Correspondingly, the other user equipments in the communication cluster may be referred to as "cluster members".

It should be noted that FIG. 1 exemplarily shows one network device and a plurality of user equipments. Optionally, the wireless communications system 100 may include a plurality of network devices; and another quantity of user equipments may be included within a coverage range of each network device, which is not limited in embodiments of the present application.

Optionally, the wireless communications system 100 may further include other network entities such as a network controller and a mobility management entity, which is not limited in embodiments of the present application.

It should be understood that the technical solutions of embodiments of the present application may be applied to various communications systems, such as a 5th generation (5G) system or a new radio (NR) system, a long term evolution (LTE) system, an LTE frequency division duplex (FDD) system, and an LTE time division duplex (TDD) system. The technical solutions provided in the present application may also be applied to a future communications system, such as a 6th generation mobile communications system or a satellite communications system.

The user equipment in embodiments of the present application may also be referred to as a terminal device, an access terminal, a subscriber unit, a subscriber station, a mobile site, a mobile station (MS), a mobile terminal (MT), a remote station, a remote terminal, a mobile device, a user terminal, a wireless communications device, a user agent, or a user apparatus. The user equipment in embodiments of the present application may be a device providing a user with voice and/or data connectivity, and may be used to connect people, objects, and machines. For example, the user equipment is a handheld device, a vehicle-mounted device, or the like having a wireless connection function. The user equipment in embodiments of the present application may be a mobile phone, a tablet computer (Pad), a notebook computer, a palmtop computer, a mobile internet device (MID), a wearable device, a vehicle, a wireless terminal in industrial control, a wireless terminal in self driving, a wireless terminal in remote medical surgery, a wireless terminal in a smart grid, a wireless terminal in transportation safety, a wireless terminal in smart city, a wireless terminal in smart home, or the like. Optionally, the user equipment may act as a base station. For example, the user equipment may act as a scheduling entity, which provides a sidelink signal between user equipments in vehicle-to-everything (V2X) or D2D, or the like. For example, a cellular phone and a car communicate with each other by using sidelink data. A cellular phone and a smart home device communicate with each other, without relaying a communication signal through a base station.

The network device in embodiments of the present application may be a device for communicating with the user equipment. The network device may also be referred to as an access network device or a wireless access network device. For example, the network device may be a base station. The network device in embodiments of the present application may be a radio access network (RAN) node (or device) that connects the user equipment to a wireless network. The base station may broadly cover various names in the following, or may be interchangeable with one of the following names, for example: a NodeB, an evolved NodeB (eNB), a next generation NodeB (gNB), a relay station, a transmitting and receiving point (TRP), a transmitting point (TP), an access point (AP), a master MeNB, a secondary SeNB, a multi-standard radio (MSR) node, a home base station, a network controller, an access node, a radio node, a transmission node, a transceiver node, a base band unit (BBU), a remote radio unit (RRU), an active antenna unit (AAU), a remote radio head (RRH), a central unit (CU), a distributed unit (DU), a positioning node, or the like. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that functions as a base station in D2D, V2X, and machine-to-machine (M2M) communication, a network-side device in a 6G network, a device that functions as a base station in a future communications system, or the like. The base station may support networks with a same access technology or different access technologies. A specific technology and a specific device form used by the network device are not limited in embodiments of the present application.

The base station may be fixed or mobile. For example, a helicopter or an unmanned aerial vehicle may be configured to act as a mobile base station; and one or more cells may move depending on a location of the mobile base station. In other examples, a helicopter or an unmanned aerial vehicle may be configured to serve as a device that communicates with another base station.

In some deployments, the network device in embodiments of the present application may be a CU or a DU, or the network device includes a CU and a DU. The gNB may further include an AAU.

The network device and the user equipment may be deployed on land, including being indoors or outdoors, handheld, or vehicle-mounted; may be deployed on a water surface; or may be deployed on a plane, a balloon, or a satellite in the air. A scenario in which the network device and the user equipment are located is not limited in embodiments of the present application.

It should be understood that all or some of functions of the communications device in the present application may also be implemented by software functions running on hardware, or by virtualization functions instantiated on a platform (for example, a cloud platform).

For ease of understanding, some related technical knowledge related to embodiments of the present application is introduced first. The following related technologies, as optional solutions, may be randomly combined with the technical solutions of embodiments of the present application, all of which fall within the protection scope of embodiments of the present application. Embodiments of the present application include at least part of the following content.

It should be understood that, for the explanation of the terms (Terminology) in embodiments of the present application, reference may be made to specification protocols TS36 series, TS37 series, and TS38 series of the 3rd generation partnership project (3GPP), and reference may also be made to specifications and protocols of the Institute of Electrical and Electronics Engineers (IEEE).

With the development of communications technologies, technical research and standardization about SL communication are carried out gradually. SL communication developed in an RAN of 5G NR release-16 Rel-16) is mainly used to support an advanced V2X application. In Rel-17, a system architecture working group 2 (system architecture 2, SA2) specializes in research and standardization for ProSe including public safety (public safety) and a commercial related service. As a part of Rel-17, to reduce power consumption for a battery-limited user and improve reliability of SL communication, a radio access network working group 1 (RAN1) and RAN2 developed power saving technologies (such as a partial sensing technology, a discontinuous reception (DRX) technology, and an inter-UE coordination (IUC) technology).

An application field of SL communications is also expanding gradually. For example, although an NR SL was originally developed to support a V2X application, the industry is increasingly keen to expand the NR SL to more commercial cases. For example, in a highly autonomous driving technology, a large amount of sensor information needs to be shared among vehicles.

Due to continuous expansion of the application field of SL communication, higher requirements are put forward for the NR SL. These requirements include two key requirements: increasing a sidelink data rate and supporting more new carriers on a sidelink. In SL communication, the sidelink data rate may be increased by supporting SL CA. A transmission bandwidth may be expanded by adding more new carriers, thereby further increasing the data rate. Therefore, how to introduce carrier aggregation to an NR SL communications system becomes one of problems to be resolved.

In embodiments of the present application, SL CA may be established based on LTE SL CA. Further, SL CA in embodiments of the present application may have the following features.

For example, SL CA in embodiments of the present application may be limited to intra-band carrier aggregation (intra-band CA) in an intelligent traffic system (ITS) band and a frequency range 1 (FR1) (namely, Band n47).

For example, SL CA in embodiments of the present application may operate in a resource allocation mode 2.

For example, all carriers of SL CA in embodiments of the present application may have same subcarrier spacing (SCS), thereby avoiding a problem that a resource selection enhancement solution and automatic gain control (AGC) are required.

For example, time resources of PSFCHs on all carriers of SL CA in embodiments of the present application may be aligned.

For example, SL CA in embodiments of the present application may reuse design of LTE SL CA in the following aspects: SL carrier selection/re-selection (carrier (re)-selection), synchronization of aggregated carriers, power split for simultaneous sidelink transmissions (Tx power split for simultaneous sidelink transmissions), and packet repetition.

For example, band merging of carrier aggregation in embodiments of the present application may be limited to intra-band contiguous carrier aggregation (intra-band contiguous CA).

Synchronization of SL CA in embodiments of the present application may reuse design of LTE SL CA. For ease of understanding, a related SL CA synchronization process executed by a UE with reference to FIG. 2 is described below by using a conventional LTE SL CA operation as an example.

Referring to FIG. 2, in step S210, a synchronization reference and a synchronisation carrier frequency are determined. Step S210 may include steps S211 to S215 (not shown in FIG. 2).

In step S211, a frequency set Set-A and a frequency set Set-B are determined. Frequencies in Set-A are a set of a plurality of frequencies that are configured by a high layer and used for transmission and reception in carrier aggregation. Frequencies in Set-B are a set of a plurality of frequencies that are configured by a high layer and can be used as synchronisation carrier frequencies.

In step S212, a synchronization reference type and a synchronization priority order are determined. All related frequencies are configured with a same synchronization reference type and a same synchronization priority order. The synchronization reference type may be one of global navigation satellite system (GNSS), gNB/eNB, or UE, and may be indicated by typeTxSync or sl-TypeTxSync. The synchronization priority order may be a GNSS-based synchronization priority order or a gNB/eNB-based synchronization priority order, and may be indicated by syncPriority or sl-SyncPriority.

In step S213, one synchronization reference is determined for all aggregated frequencies. For example, a UE may first select one frequency from a plurality of frequencies in Set-B as a synchronisation carrier frequency, and then determine a synchronization reference corresponding to the synchronisation carrier frequency. For example, the UE may determine one or more synchronization reference sources on a plurality of frequencies in Set-B, and then select a synchronization reference source with the highest priority as the synchronization reference. For another example, the UE may compare sidelink synchronization signal identities (SLSS identity, SLSS ID) carried in sidelink synchronization signals (SLSS) on a plurality of frequencies in Set-B, in-coverage indications (InCoverage), and/or subframes occupied by the SLSSs to select, as a synchronisation carrier frequency, a frequency that belongs to a highest-priority group.

In step S214, a UE derives time and frequencies of all aggregated carriers from the synchronization reference of the synchronisation carrier frequency.

In step S215, timing of transmission on all frequencies is aligned. Specifically, all frequencies have a same direct frame number (DFN) value and a same DFN offset value.

In step S220, whether to transmit an SLSS and a PSBCH is determined. Specifically, the transmitted information includes content in an SLSS ID and the PSBCH. Step S220 may include steps S221 to S224 (not shown in FIG. 2).

In step S221, in an LTE SL CA operation, after selecting the synchronization reference and the synchronisation carrier frequency, the UE may determine, based on a measurement result on the synchronisation carrier frequency, whether to transmit the SLSS and the PSBCH. If it is determined to transmit the SLSS and the PSBCH, the UE may transmit the SLSS and the PSBCH only on the synchronisation carrier frequency or a plurality of frequencies selected from Set-B.

For example, the UE may determine, based on a comparison result between a reference signal received power (RSRP) measurement result on the synchronisation carrier frequency and a threshold syncTxThreshIC or syncTxThreshOoC, whether to transmit or skip transmitting the SLSS and the PSBCH on an aggregated frequency.

In step S222, an SLSS ID is derived from the synchronization reference selected from the synchronisation carrier frequency.

In step S223, a frame number (namely, directFrameNumber) of a frame for transmitting the SLSS and the PSBCH, a subframe number (namely, directSubframeNumber) in the frame, and an in-coverage (InCoverage) value are determined based on the synchronization reference selected on the selected synchronisation carrier frequency.

In step S224, a transmit bandwidth configuration (namely, sl-Bandwidth), an uplink/downlink subframe configuration (UL/DL subframe configuration, namely, tdd-ConfigSL), and a reserved bit are determined based on the frequency on which the SLSS and the PSBCH are transmitted.

A synchronization process of LTE SL CA is described above with reference to FIG. 2. In embodiments of the present application, SL CA may reuse a method for determining a synchronisation carrier frequency in LTE SL CA.

For example, two frequency sets Set-A and Set-B are also introduced in NR SL CA. Set-A is a set of frequencies that are configured by a high layer and can be used for synchronization. Set-B is a set of frequencies that are currently aggregated by a UE and can be used for synchronization. If Set-A is not an empty set, Set-B is a subset of carriers in Set-A. The UE may compare SLSS IDs carried in SLSSs on all carriers, and select a carrier having an SLSS with the highest priority as a synchronisation carrier. Once a synchronization reference on a synchronisation carrier is selected, the synchronization reference is used for timing of all aggregated carriers.

In FIG. 2, the UE becomes a synchronization reference source by transmitting an SLSS and a PSBCH. In an NR system, the UE becomes a synchronization reference user (namely, SyncRef UE) by transmitting a sidelink synchronization signal block.

It should be understood that in embodiments of the present application, a sidelink synchronization signal block transmitted by the UE may represent a sidelink synchronization broadcast signal block (SL synchronization signal/PSBCH block, S-SS/PSBCH block, S-SSB), or may represent only a sidelink synchronization signal block (S-SSB), which is not limited herein. Therefore, each S-SSB used in this specification to represent a synchronization signal block may be replaced with an S-SS/PSBCH block.

For example, an S-SSB includes at least two of an S-PSS, an S-SSS, or a PSBCH. For example, the S-SSB may include an S-PSS and an S-SSS. For another example, the S-SSB may not include any PSBCH.

In conventional S-SSB design, one or more S-SSBs are transmitted in one fixed period (S-SSB period). One S-SSB period is, for example, 160 ms, namely, 16 radio frames. A distribution manner of a plurality of S-SSBs in an S-SSB period depends on two parameters: a slot offset from a start of the S-SSB period to the first S-SSB, and a slot interval between two contiguous S-SSBs.

For ease of understanding, distribution of a plurality of S-SSBs in a fixed period is described as an example below with reference to FIG. 3. In the example shown in FIG. 3, the fixed period is an S-SSB period, and is 16 radio frames. When 16 radio frames are used as one group, a start of each period is the first slot of a current group of radio frames, and an end of the period is the first slot of a next group of radio frames. Therefore, both a system frame number (SFN) of the current group of radio frames and a system frame number (SFN) of the next group of radio frames meet the following condition: SFN mod 16=0.

There are four S-SSBs in one fixed period in FIG. 3. A time period between a slot where the first S-SSB is and a start of the fixed period is a slot offset. A time period between two adjacent S-SSBs in FIG. 3 is a slot interval.

Design of S-SSBs is described above with reference to FIG. 3. In a Rel-16/17 NR SL system, there are generally the following two manners of triggering a UE to transmit an S-SSB. Transmitting an S-SSB by a UE may indicate that the UE becomes a SyncRef UE.

Manner 1: Whether a UE becomes a SyncRef UE is determined according to network configuration. When a network configures a UE as a SyncRef UE, no matter whether the UE has data to be transmitted on an SL, the UE transmits S-SSBs to provide an option of a synchronization reference for another UE. When a network configures a UE as a non-SyncRef UE, the UE may not transmit any S-SSB.

Manner 2: A UE itself decides whether to become a SyncRef UE. The UE may make a decision based on whether the UE is within coverage.

For example, if the UE is within coverage of a gNB/eNB, the UE measures an RSRP value of the serving cell. When the RSRP value is lower than a given threshold syncTxThreshIC, the UE may become a SyncRef UE and transmit S-SSBs; when the RSRP value is higher than or equal to a given threshold syncTxThreshIC, the UE does not transmit any S-SSB. S-SSB transmitting excited based on RSRP causes UEs near a cell edge more likely to become SyncRef UEs and to transmit S-SSBs, thereby expanding a synchronization coverage range of the serving cell. In this scenario, UEs outside coverage of a network may also use a timing reference of the cell, and perform sidelink communication (SL communication) with UEs in the cell.

For example, if the UE is outside coverage of a gNB/eNB and has selected one SyncRef UE as its synchronization reference, the UE measures an RSRP value of an S-SSB transmitted by the selected SyncRef UE. When the RSRP value is lower than a given threshold syncTxThreshOoC, the UE may become a new SyncRef UE and transmit S-SSBs; when the RSRP value is higher than or equal to a given threshold syncTxThreshOoC, the UE does not transmit any S-SSB. S-SSB transmitting excited based on RSRP of a SyncRef UE causes UEs near a synchronization coverage edge to become SyncRef UEs, thereby further expanding an operating range of SL communication.

A mechanism for transmitting an SLSS and a PSBCH in LTE SL CA is described above. If an S-SSB is transmitted in NR SL CA by completely reusing the transmitting mechanism in LTE SL CA, the following problem is caused: A non-synchronisation carrier cannot be used to perform SL communication. In other words, after the UE selects a synchronisation carrier and a synchronization reference, when an RSRP value measured on the selected synchronisation carrier is relatively high (for example, higher than or equal to a given threshold syncTxThreshIC or syncTx-ThreshOoC), the UE skips transmitting S-SSBs on all aggregated carriers.

However, among all the aggregated carriers, there may be some carriers with relatively poor coverage. In this scenario, the UE cannot transmit any S-SSB on these carriers with relatively poor coverage. As a result, the UE cannot perform SL communication on these carriers, and thus cannot further expand an SL communication range.

In summary, for an NR SL, carrier synchronization needs to be taken into account when introducing carrier aggregation. In addition, after carrier aggregation is introduced, a problem that a non-synchronisation carrier cannot be used to perform SL communication also needs to be resolved in an NR SL CA operation. Moreover, after carrier aggregation is introduced, the following technical problem also needs to be resolved: Synchronization coverage on a plurality of carriers in the NR SL is imbalanced.

It should be understood that, the above described problems in synchronization in SL communication that are caused when carrier aggregation is introduced to the NR SL are only examples. Embodiments of the present application may be applied to any scenario in which a communication system has a similar problem after carrier aggregation is introduced.

To resolve the foregoing problems, an embodiment of the present application provides a method applied to a first node used for wireless communication. According to the method, the first node may perform measurements on a plurality of frequencies that are used for aggregation or synchronization; and determine, based on a plurality of measurement results, whether to transmit a sidelink synchronization signal block. In other words, in an SL CA operation of the first node in embodiments of the present application, although the method for determining a synchronisation carrier frequency in LTE SL CA is still used, an S-SSB transmitting mechanism excited based on a measurement result (for example, an RSRP value) is optimized, so that an SL communication range may also be expanded on a frequency with relatively weak synchronization coverage.

The method embodiments of the present application will be described below in detail with reference to the drawings. FIG. 4 is a schematic flowchart of a method applied to a first node used for wireless communication according to an embodiment of the present application. The method shown in FIG. 4 includes step S410. It should be understood that the method shown in FIG. 4 may be performed by a first node.

In some implementations, the first node may be any one of the foregoing user equipments that performs sidelink communication. For example, the first node may be a vehicle in V2X, or may be a basic communications facility in V2X. In some implementations, the first node may be within coverage of a network, or may be outside coverage of a network. When the first node is within the coverage of the network, the first node may perform sidelink communication based on a configuration of a network device.

In an embodiment, the first node may be a network-controlled repeater (NCR).

In an embodiment, the first node may be a user equipment, for example, any one of user equipments 121 to 129 shown in FIG. 1.

In an embodiment, the first node may be a relay, such as a relay terminal.

Referring to FIG. 4, in step S410, measurements are respectively performed on all frequencies in a first frequency subset to obtain a plurality of measurement results, where the first frequency subset belongs to a first frequency set.

In an embodiment, "frequency" may be replaced with "carrier" or "carrier frequency". In other words, "frequency set" may be replaced with "carrier set" or "carrier frequency set"; and "frequency subset" may be replaced with "carrier subset" or "carrier frequency subset".

The first frequency set is a set of a plurality of frequencies the first node can perform frequency synchronization. For example, the first frequency set may be Set-A or Set-B configured by a network device or a high layer. As described above, Set-A is a subset of a plurality of synchronized frequencies used for transmission and reception; and Set-B is a subset of frequencies that are in Set-A and can be used for synchronization.

In an embodiment, the first frequency set includes a plurality of frequencies.

In an embodiment, all of the plurality of frequencies in the first frequency set are synchronisation frequencies.

In an embodiment, all of the plurality of frequencies in the first frequency set are frequencies that can be used for synchronization.

In an embodiment, all of the plurality of frequencies in the first frequency set are available frequencies synchronized by the first node.

To perform a synchronization process on a plurality of frequencies, the first frequency set may include a synchronisation carrier frequency related to a synchronization reference. The synchronisation carrier frequency may be a frequency that is selected by the first node from the first frequency set and used for synchronization. Therefore, the synchronisation carrier frequency may also be referred to as a synchronisation frequency.

In some embodiments, the first node may select a synchronization reference and a synchronisation carrier frequency. The synchronisation carrier frequency is one of a plurality of frequencies included in the first frequency set. The synchronization reference may be related to the synchronisation carrier frequency. In other words, the synchronization reference may be determined based on the synchronisation carrier frequency selected by the first node.

In an embodiment, the synchronisation carrier frequency is selected from the plurality of frequencies included in the first frequency set.

In some embodiments, the synchronisation carrier frequency is used by the first node for determining the synchronization reference. For example, a synchronization source on the synchronisation carrier frequency is selected by the first node as the synchronization reference.

For example, the synchronization reference may be one of a GNSS, a base station, or a SyncRef UE. GNSSs and base stations (gNB/eNB) are two main types of synchronization reference sources. A SyncRef UE may become a synchronization reference source of a node by transmitting synchronization information (for example, an S-SSB).

In an embodiment, the synchronisation carrier frequency is used to determine the synchronization reference.

In an embodiment, the synchronization reference is used to determine the synchronisation carrier frequency.

In an embodiment, a synchronization source on the synchronisation carrier frequency is selected as the synchronization reference. In other words, a synchronization source on the synchronisation carrier frequency is selected by the first node as the synchronization reference.

In an embodiment, a synchronization source monitored on the synchronisation carrier frequency is selected as the synchronization reference.

In some embodiments, the first node may synchronize all frequencies by selecting a synchronisation carrier frequency. For example, the first node may select a synchronization reference based on the synchronisation carrier frequency, and derive a time of another synchronized frequencies based on the synchronization reference.

For example, the synchronisation carrier frequency is a frequency that is in the first frequency set and belongs to a highest-priority group.

In an embodiment, the first node may compare SLSS IDs carried by SLSSs on the plurality of frequencies in the first frequency set, to select a synchronisation carrier frequency.

In an embodiment, the first node may compare in-coverage indications carried by SLSSs on the plurality of frequencies in the first frequency set, to select a synchronisation carrier frequency.

In an embodiment, the first node may compare subframes occupied by SLSSs on the plurality of frequencies in the first frequency set, to select a synchronisation carrier frequency.

For example, the synchronisation carrier frequency is a frequency that is in the first frequency set and more conducive to synchronization (alignment) of a plurality of frequencies.

The first node may determine the first frequency set in a plurality of manners. In some embodiments, the first node may interact with a second node, to determine the first frequency set or obtain a second frequency set used for determining the first frequency set. In some embodiments, the first node may refer to a configuration of a high layer, to determine the first frequency set or obtain a second frequency set used for determining the first frequency set. In some embodiments, after obtaining the second frequency set, the first node may determine the first frequency set according to a specific principle. In other words, the first frequency set may be determined based on the second frequency set.

In some embodiments, the second frequency set includes the first frequency set. For example, the first frequency set may be a subset of the second frequency set. For example, the first frequency set is Set-B, and the second frequency set is Set-A. For another example, the first frequency set may be composed of one or more frequencies selected by the first node from the second frequency set.

In an embodiment, the second frequency set includes a plurality of frequencies.

In an embodiment, the plurality of frequencies in the second frequency set include the plurality of frequencies in the first frequency set.

In an embodiment, at least one frequency in the second frequency set does not belong to the first frequency set.

In an embodiment, the first frequency set is determined by the first node itself from the second frequency set.

In an embodiment, the first frequency set is determined from the second frequency set.

In some embodiments, the second frequency set is the same as the first frequency set. For example, both the first frequency set and the second frequency set are Set-A.

The second frequency set may be configured by a higher layer, or may be configured by a network, a cell, or a base station. This is not limited herein.

In an embodiment, the second frequency set is configured by a higher layer.

In an embodiment, the second frequency set is configured by using radio resource control (RRC) layer signalling. For example, the second frequency set may be delivered layer by layer to a physical layer by an RRC layer corresponding to the first node.

In an embodiment, the first frequency set is configured by a higher layer.

It may be learned from the foregoing that the first node may obtain the second frequency set by interacting with the second node, thereby determining the first frequency set. The second node may be any one of the network devices described above, or may be another communications device that notifies the first node of the second frequency set.

In an embodiment, the second node is a base station.

For ease of understanding, an implementation in which the first node determines the first frequency set is described as an example below with reference to FIG. 5. FIG. 5 shows a method, described from a perspective of interaction between a first node and a second node, for the second node used for wireless communication according to an embodiment of the present application. FIG. 5 shows a possible implementation of FIG. 4. For brevity, the terms already explained in FIG. 4 are not described again.

Referring to FIG. 5, in step S510, the second node transmits first information to the first node, where the first information includes a second frequency set. In other words, the second node transmits the second frequency set to the first node.

In step S520, the first node determines, based on the second frequency set, a first frequency set that includes a first frequency subset.

It may be learned from FIG. 5 that a network device may configure a second frequency set for the first node, so that the first node aggregates frequencies.

Still referring to step S410 in FIG. 4, the first frequency subset belongs to the first frequency set. For example, the first frequency subset is a subset of the first frequency set. In other words, the first frequency subset may be a set of one or more frequencies in the first frequency set.

In an embodiment, the first frequency subset includes a plurality of frequencies.

In an embodiment, the first frequency set includes the first frequency subset.

In an embodiment, the plurality of frequencies included in the first frequency subset are respectively the plurality of frequencies included in the first frequency set.

In some embodiments, the first frequency subset does not include a synchronisation carrier frequency that is in the first frequency set and used for synchronization; and the first node does not measure the synchronisation carrier frequency. In this scenario, when measuring frequencies in the first frequency subset, the first node may pay more attention to a frequency with a relatively low priority. In some embodiments, the first frequency subset includes a synchronisation carrier frequency that is in the first frequency set and used for synchronization.

In some embodiments, the first frequency subset may include a synchronisation carrier frequency that is in the first frequency set and used for synchronization; and a measurement result of the first node for the synchronisation carrier frequency is used to determine whether to transmit a sidelink synchronization signal.

In some embodiments, the synchronization reference is used for all the frequencies in the second frequency set. For example, after determining the synchronization reference based on the synchronisation carrier frequency, the first node may derive, based on the synchronization reference, time of all the synchronized frequencies in the second carrier set. For example, the first node may perform a subsequent measurement based on the determined synchronization reference.

In an embodiment, the synchronization reference is used for time-frequency synchronization of all the frequencies in the second frequency set.

In an embodiment, the synchronization reference is used for timing of transmission on all the frequencies in the second frequency set.

In an embodiment, the synchronization reference is used for timing of reception on all the frequencies in the second frequency set.

In an embodiment, the synchronization reference is used for all the frequencies in the first frequency set. For example, the synchronization reference determined by the first node is used to measure all frequencies in Set-B.

In an embodiment, the synchronization reference is used for time-frequency synchronization of all the frequencies in the first frequency set.

In an embodiment, the synchronization reference is used for timing of transmission on all the frequencies in the first frequency set.

In an embodiment, the synchronization reference is used for timing of reception on all the frequencies in the first frequency set.

In some embodiments, all the frequencies in the first frequency subset may be frequencies having a same characteristic. This helps the first node select the frequencies in the first frequency subset from the first frequency set. In other words, the first node may select, from the first frequency set based on a specific characteristic, one or more frequencies that belong to the first frequency subset. For example, a common characteristic of all the frequencies in the first frequency subset may be used to distinguish between frequencies in the first frequency set. For example, the first node is within coverage on the first frequency subset, or the first node is not within coverage on the first frequency subset. The first node being not within coverage may also be referred to as the first node being outside coverage.

In an embodiment, the first node being within coverage on a frequency may be replaced with the first node having detected a reference signal on the frequency or a signal detected by the first node on the frequency being reliable. Correspondingly, the first node being not within coverage on a frequency means that the first node has not detected any reference signal or reliable signal on the frequency.

In an embodiment, the first node being within coverage on a frequency may also be replaced with the first node being capable of performing time or frequency synchronization based on a synchronization source on the frequency. Correspondingly, the first node being not within coverage on a frequency means that the first node is incapable of performing synchronization on the frequency.

For example, the first node is within coverage related to the synchronization reference on the first frequency subset; or the first node is not within coverage related to the synchronization reference on the first frequency subset.

In an embodiment, the first node being within coverage related to the synchronization reference on a frequency may be replaced with the first node having detected a signal related to the synchronization reference on the frequency. Correspondingly, the first node being not within coverage related to the synchronization reference on a frequency means that the first node has not detected any signal related to the synchronization reference on the frequency.

In an embodiment, the signal related to the synchronization reference may be a reference signal or another signal that is used by the first node for synchronization with the synchronization reference. The signal related to the synchronization reference may be a related signal transmitted by the synchronization reference. For example, when the synchronization reference is a GNSS, the signal related to the synchronization reference is a reliable GNSS signal.

In an embodiment, the signal transmitted by the synchronization reference may be a downlink signal. For example, when the synchronization reference determined based on the synchronisation carrier frequency is a gNB/an eNB, the signal related to the synchronization reference is a downlink reference signal transmitted by the gNB/eNB.

In an embodiment, the signal transmitted by the synchronization reference may be a sidelink signal. For example, when the synchronization reference is a SyncRef UE, the signal related to the synchronization reference is an S-SSB.

In an embodiment, the first node being within coverage on the first frequency subset means that the first node is within coverage related to the synchronization reference on all the frequencies in the first frequency subset.

In an embodiment, the first node being not within coverage on the first frequency subset means that the first node is not within coverage related to the synchronization reference on any of the frequencies in the first frequency subset.

For example, all the frequencies in the first frequency subset are a plurality of frequencies that are in the first frequency set and meet a first condition. When the first node performs measurements on the plurality of frequencies that meet the first condition, values of the plurality of measurement results are relatively approximate. This may help the first node perform calculation or comparison based on the measurement results of the plurality of frequencies, and facilitate determining a related threshold.

In an implementation, the first condition may be the first node being within coverage on a frequency, or the first node being not within coverage on a frequency.

In an embodiment, the first node is within coverage on a frequency that meets the first condition. This may help the first node perform a measurement on the frequency, where a value of the measurement result is relatively high.

In an embodiment, the first node is not within coverage on a frequency that meets the first condition. This may help the first node perform a measurement on the frequency, where a value of the measurement result is relatively low.

In another implementation: the first condition may be the first node being within the coverage related to the synchronization reference on a frequency, or the first node is not within the coverage related to the synchronization reference on a frequency.

In an embodiment, the first node is within the coverage related to the synchronization reference on a frequency that meets the first condition.

In an embodiment, the first node is out of the coverage related to the synchronization reference on a frequency that meets the first condition.

In some embodiments, the first node is within coverage on the first frequency subset; or the first node is not within coverage on the first frequency subset. This may help compare a plurality of measurement results. If the first node is within the coverage on some frequencies in the first frequency subset but is not within the coverage on some other frequencies, there is a relatively large difference among RSRP values obtained via measurements performed by the first node. As a result, subsequent calculation cannot be performed.

In some embodiments, all the frequencies in the first frequency subset may alternatively be frequencies having different characteristics. This helps the first node determine frequencies at which sidelink synchronization signal blocks are to be transmitted.

In an embodiment, when the first frequency subset is the same as the first frequency set, the first node may measure all the frequencies in the first frequency set, to determine frequencies with relatively weak coverage in the first frequency set. The first node may transmit S-SSBs at these frequencies with relatively weak coverage, to balance synchronization coverage ranges of a plurality of frequencies.

In an embodiment, the first frequency subset may be a set of representatives of a plurality of types of frequencies in the first frequency set, to reduce a measurement requirement and power consumption. For example, frequencies in the first frequency set may be classified into a plurality of types; and the first frequency subset may include at least one frequency of each of all or some of the types.

In some embodiments, the first frequency subset belongs to the first frequency set, which may further include the frequencies in the first frequency subset being the same as the frequencies in the first frequency set.

In an embodiment, the first frequency subset is the same as the first frequency set.

In some embodiments, the first frequency subset belongs to the first frequency set, which may alternatively be the first frequency subset being determined from the first frequency set. For example, the first node determines the first frequency subset based on the first frequency set.

In some embodiments, the first frequency subset may include one frequency in the first frequency set, or may include a plurality of frequencies in the first frequency set.

In an embodiment, any frequency in the first frequency subset is a frequency in the first frequency set.

In an embodiment, at least one frequency in the first frequency set is different from any frequency in the first frequency subset.

The first frequency subset may be determined by the first node itself, or may be configured by a network or a base station.

In an embodiment, the first frequency subset is determined by the first node itself from the first frequency set.

In an embodiment, the first frequency subset is configured by a higher layer.

In an embodiment, the higher layer includes a layer higher than a physical layer. For example, the higher layer is an RRC layer.

Still referring to FIG. 4, after determining the first frequency subset, the first node separately measures all the frequencies in the first frequency subset, which helps determine whether to transmit one or more sidelink synchronization signal blocks (S-SSB(s)) on one or more frequencies in the first frequency set. The first node may obtain a plurality of measurement results via a plurality of measurements.

The one or more frequencies in the first frequency set may be any one or more frequencies in the first frequency set. An SL communication range may be expanded by transmitting S-SSB(s) on the one or more frequencies, thereby improving communication efficiency.

In an embodiment, one frequency in the first frequency set may be a synchronisation carrier frequency, or may not be a synchronisation carrier frequency.

In an embodiment, a plurality of frequencies in the first frequency set may be all or some of the frequencies in the first frequency subset, or may not include any frequency in the first frequency subset.

The first node respectively performing measurements on all the frequencies in the first frequency subset includes the first node respectively performing a plurality of measurements on the plurality of frequencies in the first frequency subset based on a selected synchronization reference. By the plurality of measurements, when determining whether to transmit S-SSB(s), the first node takes into account some frequencies with relatively weak coverages, so as to balance synchronization coverage and expand a synchronization coverage range.

In some embodiments, the measurements respectively performed by the first node on all the frequencies in the first frequency subset are performed based on a same synchronization reference. By measuring these frequencies based on the same synchronization reference, it is convenience for the first node to compare measurement results and coverage ranges of different frequencies.

In an embodiment, the measurements respectively performed on all the frequencies in the first frequency subset are performed respectively on all the frequencies in the first frequency subset with respect to the same synchronization reference.

In an embodiment, any one of the plurality of measurement results is a measurement result with respect to the same synchronization reference.

In an embodiment, when the measurements are respectively performed on all the frequencies in the first frequency subset, the synchronization references used for these frequencies are the synchronization reference selected on a synchronisation carrier frequency.

In some embodiments, the first node monitors a related signal on a frequency based on a synchronization reference, and performs a measurement. For example, the first node measures, on the frequency, an RSRP value of a related signal transmitted by the synchronization reference.

In some embodiments, the plurality of measurement results are values of the synchronization reference that are obtained via measurements respectively performed by the first node on the plurality of frequencies. After determining the synchronization reference, the first node may respectively perform measurements on all the frequencies in the first frequency subset based on the synchronization reference. For example, a plurality of synchronization reference-based RSRP values are respectively measured on all frequencies in Set-B or Set-A.

For example, for a determined synchronization reference, the plurality of measurement results are respectively a plurality of measurement results that are obtained based on the synchronization reference. For example, the plurality of measurement results are respectively a plurality of RSRP values that are obtained based on the synchronization reference.

In an embodiment, the plurality of measurement results are respectively a plurality of RSRP values with respect to the synchronization reference.

In an embodiment, the plurality of RSRP values are respectively a plurality of RSRP values of a reference cell.

In an embodiment, the plurality of RSRP values are respectively a plurality of RSRP values of a reference cell that are obtained via measurements on a plurality of frequencies.

In an embodiment, the plurality of RSRP values are respectively a plurality of S-RSRP (sidelink RSRP) values.

In an embodiment, the plurality of RSRP values are respectively a plurality of S-RSRP values of a SyncRef UE.

In an embodiment, the plurality of RSRP values are respectively a plurality of S-RSRP values of a SyncRef UE that are obtained via measurements on a plurality of frequencies.

In some embodiments, the plurality of measurement results correspond to all the frequencies in the first frequency subset. In other words, the first node respectively performs measurements on all the frequencies in the first frequency subset, to obtain a plurality of corresponding measurement results.

In an embodiment, the plurality of measurement results are in a one-to-one correspondence with all the frequencies in the first frequency subset. For example, when there are 10 frequencies in the first frequency subset, 10 measurement results may be obtained via measurements.

In some embodiments, the plurality of measurement results are parameter values of a same type, which helps the first node compare coverage statuses of a plurality of frequencies based on the plurality of measurement results. For example, the plurality of measurement results are respectively a plurality of RSRP values.

In some embodiments, the measurement result may be any parameter that represents a signal quality. This is not limited herein. For example, the measurement result may be an RSRP value, and thus may be determined by measuring received power of a signal. For another example, the measurement result may be a reference signal received quality (RSRQ). For still another example, the measurement result may be a received signal strength indication (RSSI). For yet another example, the measurement result may be a signal to interference plus noise ratio (SINR).

For ease of understanding, a possible implementation of the method shown in FIG. 4 is described as an example below with reference to FIG. 6 by using an example in which a plurality of measurement results are respectively a plurality of RSRP values. In FIG. 6, horizontal coordinates represent frequencies; and vertical coordinates represent a plurality of RSRP values obtained via measurements respectively performed by the first node on a plurality of frequencies.

Referring to FIG. 6, the first frequency subset includes N frequencies that are respectively frequency 1, frequency 2, . . . , and frequency N, where N is a positive integer. Frequency k is any frequency in the first frequency subset, where $1 \leq k \leq N$. As shown in FIG. 6, the first node respectively performs measurements on the N frequencies in the first frequency subset; and N RSRP values may be obtained. FIG. 6 shows that the plurality of RSRP values obtained by respectively performing the measurements on the N frequencies are different. It should be understood that results of the measurements respectively performed by the first node on all the frequencies in the first frequency subset may alternatively be partially the same.

In FIG. 6, the first node selects frequency k as a synchronisation carrier frequency. A result of a measurement performed by the first node on another frequency is an RSRP value with respect to a synchronization reference selected on frequency k. In FIG. 6, a result of a measurement performed by the first node on frequency k may be or may not be a maximum value of the measurements performed on the N frequencies.

It should be understood that in FIG. 6, frequency k in the first frequency subset being selected as the synchronisation carrier frequency is merely an example. In some embodiments, the synchronisation carrier frequency may not be any frequency in the first frequency subset.

In some embodiments, the plurality of measurement results are used to determine whether to transmit a sidelink synchronization signal block on one or more frequencies in the first frequency set.

For example, the plurality of measurement results are used to determine a first parameter; and the first parameter is used to determine whether to transmit the sidelink synchronization signal block on the one or more frequencies in the first frequency set.

In a possible implementation, the first parameter may be a parameter that is of the same type as the measurement result, or may be a parameter that is of a different type and is obtained via conversion performed on the plurality of measurement results. For example, when the plurality of measurement results are a plurality of RSRP values, the first parameter may be a first RSRP value.

In a possible implementation, the first parameter may be one of a plurality of parameters related to the plurality of measurement results. For example, the first parameter may be one of: an average value of the plurality of measurement results; a minimum value of the plurality of measurement results; a maximum value of the plurality of measurement results; or a measurement result at a first position of the plurality of measurement results.

In a possible implementation, the first parameter may alternatively be determined based on part of the plurality of measurement results. Details are not described herein again.

In an embodiment, the first parameter is the average value of the plurality of measurement results. For example, after performing measurements on a plurality of carriers, the first node may obtain an average value of a plurality of measurement results. For another example, the first parameter is a linear average value of the plurality of RSRP values.

In an embodiment, the first parameter is the minimum value of the plurality of measurement results, to ensure SL communication of a carrier with relatively weak coverage. For example, the first parameter is a minimum value of the plurality of RSRP values.

In an embodiment, the first parameter is the maximum value of the plurality of measurement results.

In an embodiment, the first parameter is the measurement result at a first position of the plurality of measurement results. After the plurality of measurement results are ranked according to a specific rule, the first parameter may be a value at a first position.

In an embodiment, the first position is configured by a higher layer.

In an embodiment, the first position is configured by using RRC layer signalling.

In an embodiment, the first position is configured by a base station or a network or a cell.

In an embodiment, values of the plurality of measurement results are ranked in descending order, or values of the plurality of measurement results are ranked in ascending order. For example, the first parameter is the $X^{th}$ value (X is a positive integer) in the plurality of RSRP values ranked in ascending order or descending order.

In an embodiment, the first parameter includes a plurality of measurement results. In other words, the first parameter is the plurality of measurement results or part of the plurality of measurement results. The plurality of measurement results may include a first measurement result; and the first measurement result is any one of the plurality of measurement results. The first parameter may be one or more first measurement results.

In an embodiment, the first measurement result is a result obtained via a measurement performed by the first node on a frequency corresponding to the first measurement result.

How to determine the first parameter is described above. In the present application, the first parameter and a first threshold are used to determine whether to transmit a sidelink synchronization signal block on one or more frequencies in the first frequency set.

The first threshold may be a given relevant parameter used to determine whether to transmit the sidelink synchronization signal block. In some embodiments, a value of the first threshold is related to the plurality of measurement results. For example, when the plurality of measurement results are a plurality of RSRP values, the first threshold may be compared with the plurality of RSRP values separately.

The first threshold may be configured by a higher layer, or may be configured by a network or a cell or a base station, or may be determined by the first node based on an actual communication situation.

In some embodiments, the first threshold may be determined based on whether the first node is within coverage. For example, the first node may determine, based on an S-SSB transmitted by the synchronization reference, whether the first node is within the coverage, thereby determining the first threshold. For example, if the first node is within the coverage, the first threshold is a first candidate threshold; if the first node is outside the coverage, the first threshold is a second candidate threshold.

For example, the first threshold is the first candidate threshold or the second candidate threshold; and whether the first node is within coverage on the first frequency subset is used to determine the first threshold.

In an embodiment, when the first node is within the coverage on the first frequency subset, the first threshold is the first candidate threshold; when the first node is not within the coverage on the first frequency subset, the first threshold is the second candidate threshold. As described above, the first node being within the coverage on the first frequency subset means that the first node is within coverage related to the synchronization reference on all the frequencies in the first frequency subset. Correspondingly, the first node being not within the coverage on the first frequency subset means that the first node is not within the coverage related to the synchronization reference on any of the frequencies in the first frequency subset.

The first node may obtain the first candidate threshold and the second candidate threshold in a plurality of manners. In some embodiments, the first node may obtain the first candidate threshold and the second candidate threshold by interacting with the second node. In some embodiments, the first node may obtain the first candidate threshold and the second candidate threshold based on a configuration from a higher layer.

For example, the second node may transmit, to the first node, second information including the first candidate threshold and the second candidate threshold. The second information and whether the first node is within the coverage on the first frequency subset are jointly used to determine the first threshold.

In some embodiments, a comparison result between the first parameter and the first threshold is used to determine whether to transmit the sidelink synchronization signal block on the one or more frequencies in the first frequency set. For example, when the first parameter is lower than the first threshold, S-SSBs are transmitted on the one or more frequencies in the first frequency set; when the first parameter is not lower than the first threshold, transmitting S-SSBs is skipped on the one or more frequencies in the first frequency set.

For ease of understanding, an implementation of determining whether to transmit a sidelink synchronization signal is described as an example below with reference to FIG. 7. Steps in FIG. 7 may be a process after the step shown in FIG. 4. The process as shown in FIG. 7 is performed by the first node.

Figures 7, 8, 9:
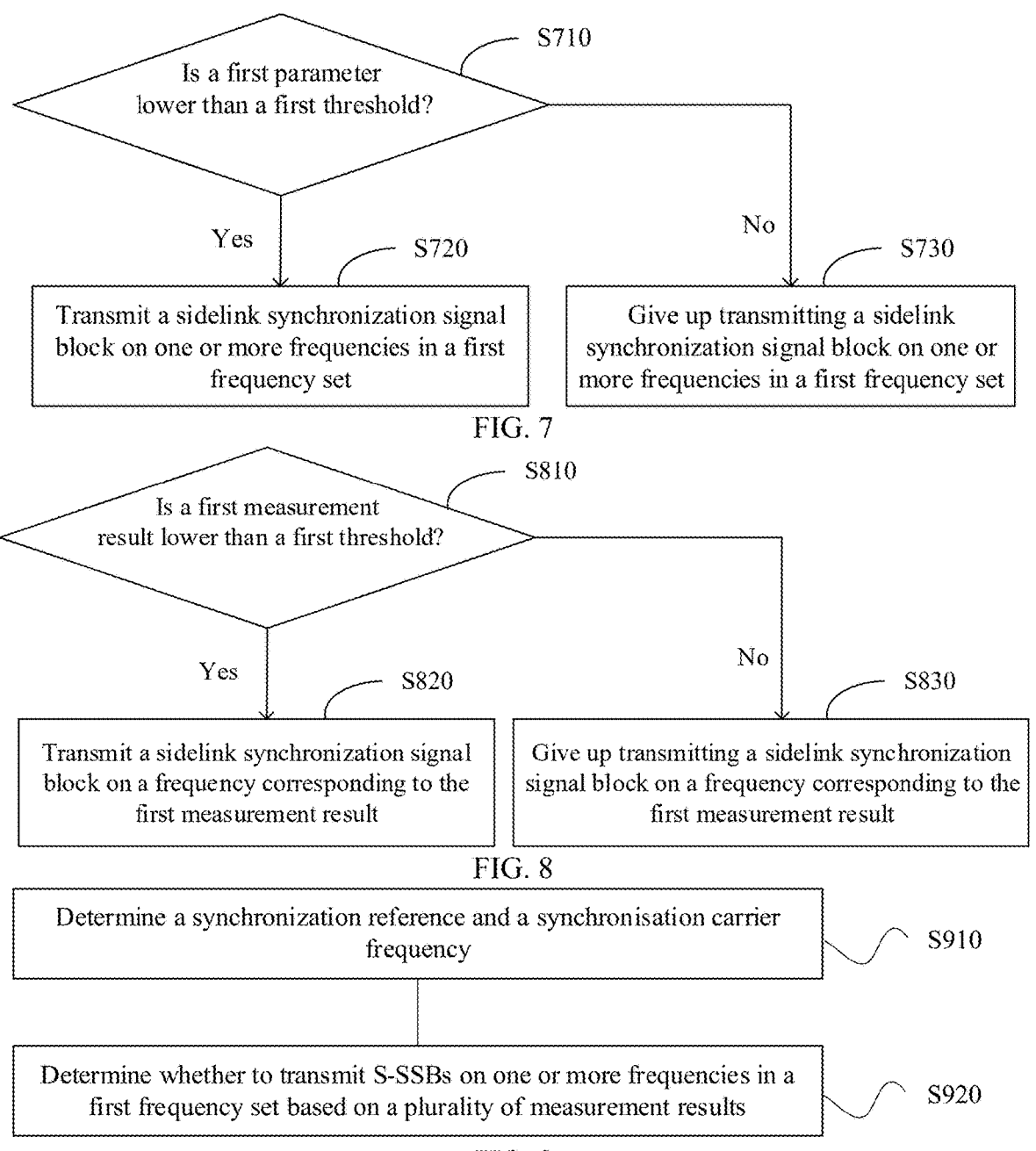
FIG. 7 is a schematic flowchart of a possible implementation of determining whether to transmit a sidelink synchronization signal block.
FIG. 8 is a schematic flowchart of another possible implementation of determining whether to transmit a sidelink synchronization signal block.
FIG. 9 is a schematic flowchart of another possible implementation of the method shown in FIG. 4.

Referring to FIG. 7, in step S710, whether a first parameter is lower than a first threshold is determined. The first parameter may be determined based on the plurality of measurement results obtained in step S410 shown in FIG. 4. If the first parameter is lower than the first threshold, perform step S720. If the first parameter is not lower than the first threshold, perform step S730.

In step S720, a sidelink synchronization signal block is transmitted on one or more frequencies in a first frequency set.

In step S730, transmitting a sidelink synchronization signal block is skipped on one or more frequencies in a first frequency set.

In an embodiment, the first parameter is an average value of the plurality of measurement results; and whether to transmit S-SSBs is determined based on a comparison result between the average value and the first threshold, thereby equalizing synchronization coverage of the plurality of frequencies. For example, the first node may determine, based on a synchronization reference selected on a selected frequency (synchronization carrier frequency), whether to transmit the S-SSBs on all frequencies based on a comparison result between an average value of RSRP values measured on a plurality of frequencies and the first threshold.

In an embodiment, the first parameter is a minimum value of the plurality of measurement results; and whether to transmit S-SSBs is determined based on a comparison result between the minimum value and the first threshold, thereby ensuring SL communication on a frequency with relatively weak coverage.

For example, the first node may respectively measure RSRP values of a synchronization reference on all the frequencies in Set-B, where the synchronization reference is selected on the synchronisation carrier frequency; and determine, based on a comparison result between a minimum RSRP value and the first threshold, whether to transmit the S-SSBs on all the frequencies.

For another example, the first node may respectively measure RSRP values of a synchronization reference on all the frequencies in Set-A, where the synchronization reference is selected on the synchronisation carrier frequency; and determine, based on a comparison result between a minimum RSRP value and the first threshold, whether to transmit the S-SSBs on all the frequencies.

In an embodiment, the first parameter is a measurement result at a first position of the plurality of measurement results; and whether to transmit the S-SSBs is determined based on a comparison result between the measurement result at the first position and the first threshold. In a scenario in which the first position may be adjusted dynamically, the first node may adjust synchronization coverage ranges of a plurality of frequencies according to an actual situation.

For example, the first node may respectively measure RSRP values of a synchronization reference on all the frequencies in Set-B, where the synchronization reference is selected on the synchronisation carrier frequency. After these RSRP values are ranked in ascending order, whether to transmit the S-SSBs on all the frequencies may be determined based on a comparison result between the first threshold and the $X^{th}$ RSRP value.

In an embodiment, when the first parameter is one or more first measurement results, a comparison result between a first measurement result and the first threshold is used to determine whether to transmit a sidelink synchronization signal block on a frequency corresponding to the first measurement result.

For example, when the first measurement result is lower than the first threshold, the sidelink synchronization signal block is transmitted on the frequency corresponding to the first measurement result; when the first measurement result is not lower than the first threshold, transmitting the sidelink synchronization signal block is skipped on the frequency corresponding to the first measurement result.

For ease of understanding, another implementation of determining whether to transmit a sidelink synchronization signal is described as an example below with reference to FIG. 8. Steps in FIG. 8 may be a process after the step shown in FIG. 4. The process as shown in FIG. 8 may be performed by the first node.

Referring to FIG. 8, in step S810, whether a first measurement result is lower than a first threshold is determined. The first measurement result is one of the plurality of measurement results obtained in step S410 shown in FIG. 4. If the first measurement result is lower than the first threshold, perform step S820. If the first measurement result is not lower than the first threshold, perform step S830.

In step S820, a sidelink synchronization signal block is transmitted on a frequency corresponding to the first measurement result.

In step S830, transmitting a sidelink synchronization signal block is skipped on a frequency corresponding to the first measurement result.

In an embodiment, a comparison result between each of the plurality of measurement results and the first threshold is used to determine whether to transmit the sidelink synchronization signal block on a frequency corresponding to the measurement result. For example, the first node transmits the S-SSBs on a frequency corresponding to a measurement result that is in the plurality of measurement results and is lower than the first threshold, and skips transmitting the S-SSBs on a frequency corresponding to a measurement result that is in the plurality of measurement results and is not lower than the first threshold.

Embodiments of the present application are described below in more detail with reference to FIG. 9 as a specific example. It should be noted that the examples in FIG. 4 to FIG. 8 are merely intended to help a person skilled in the art understand the embodiments of the present application, and are not intended to limit the embodiments of the present application to a specific value or a specific scenario that is exemplified. Apparently, a person skilled in the art may perform various equivalent modifications or variations based on the examples given in FIG. 4 to FIG. 8, and such modifications or variations also fall within the scope of embodiments of the present application.

In FIG. 9, an NR SL CA synchronization process executed by a UE is used as an example to describe a method embodiment of the present application.

Referring to FIG. 9, in step S910, a synchronization reference and a synchronisation carrier frequency are determined. Step S910 may include steps S911 to S915 (not shown in FIG. 9). Steps S911 to S915 are consistent with the process of steps S211 to S215 in FIG. 2. Details are not described herein again. However, frequency aligning information in step S915 is different from that in step S215.

In step S915, timing of transmission on all frequencies is aligned. Specifically, all the frequencies have a same S-SSB period, a same SFN value, a same slot offset value, a same slot interval value, a same quantity of S-SSBs, and the like. For meanings of the foregoing parameters that need to be aligned, refer to FIG. 3.

In step S920, whether to transmit S-SSBs on one or more frequencies in a first frequency set is determined based on a plurality of measurement results. The first frequency set may be Set-B or Set-A that is described above. The first frequency set includes a first frequency subset. The one or more frequencies in the first frequency set may be synchronisation carrier frequencies, or may be all frequencies in the first frequency subset, or may be all frequencies in the first frequency set. Step S920 may include steps S921 to S926 (not shown in FIG. 9). Step S924 is consistent with step S222 in FIG. 2. Details are not described herein again.

In step S921, a plurality of RSRP values (the plurality of measurement results) based on the synchronization reference are respectively measured on all carriers in a first frequency subset, to determine a first RSRP value. The first RSRP value is the first parameter.

In step S922, whether a UE is within coverage is determined based on an S-SSB transmitted by the synchronization reference, thereby determining a first threshold.

In step S923, a comparison result between the first RSRP value and the first threshold is used to determine whether to transmit the S-SSBs by the UE on the one or more frequencies in the first frequency set. When the first RSRP value is lower than the first threshold, the UE determines to transmit the S-SSBs on the one or more frequencies in the first frequency set. When the first RSRP value is higher than or equal to the first threshold, the UE determines to skip transmitting the S-SSBs on the one or more frequencies in the first frequency set.

In step S925, a time resource (sl-SSB-TimeAllocation) for transmitting an S-SSB and an in-coverage value are determined based on the synchronization reference selected on the selected synchronisation carrier frequency.

In step S926, a transmit bandwidth configuration, an uplink/downlink subframe configuration, and a reserved bit are determined based on the frequency on which the S-SSBs are to be transmitted.

It may be learned by comparing FIG. 9 with FIG. 2 that, in this embodiment of the present application, an S-SSB transmitting mechanism excited based on RSRP is optimized on the basis of a related method of determining a synchronisation carrier frequency, so that an SL communication range may be further expanded on a frequency with relatively weak synchronization coverage, which effectively resolves the problem of imbalanced synchronization coverages of multiple frequencies.

The method embodiments of the present application are described in detail above with reference to FIG. 1 to FIG. 9. The apparatus embodiments of the present application are described in detail below with reference to FIG. 10 to FIG. 13. It should be understood that the description of the method embodiments corresponds to the description of the apparatus embodiments, and therefore, for a part that is not described in detail, reference may be made to the foregoing method embodiments.

FIG. 10 shows a first node used for wireless communication according to an embodiment of the present application. As shown in FIG. 10, the first node 1000 includes a processor 1010.

The processor 1010 may be configured to respectively perform measurements on all frequencies in a first frequency subset to obtain a plurality of measurement results, where a first parameter and a first threshold are used to determine whether to transmit a sidelink synchronization signal block on one or more frequencies in a first frequency set; the plurality of measurement results are used to determine the first parameter; and the first frequency subset belongs to the first frequency set.

In an embodiment, a comparison result between the first parameter and the first threshold is used to determine whether to transmit the sidelink synchronization signal block on the one or more frequencies in the first frequency set; and the first parameter is one of: an average value of the plurality of measurement results; a minimum value of the plurality of measurement results; a maximum value of the plurality of measurement results; or a measurement result at a first position of the plurality of measurement results ranked in descending order or in ascending order according to values of the plurality of measurement results.

In an embodiment, the first node 1000 further includes a first transmitter that may be configured to: when the first parameter is lower than the first threshold, transmit the sidelink synchronization signal block on the one or more frequencies in the first frequency set; when the first parameter is not lower than the first threshold, skip transmitting the sidelink synchronization signal block on the one or more frequencies in the first frequency set.

In an embodiment, the first parameter includes the plurality of measurement results; a first measurement result is included in the plurality of measurement results; and a comparison result between the first measurement result and the first threshold is used to determine whether to transmit the sidelink synchronization signal block on a frequency corresponding to the first measurement result.

In an embodiment, the first node 1000 further includes a second transmitter that may be configured to: when the first measurement result is lower than the first threshold, transmit the sidelink synchronization signal block on the frequency corresponding to the first measurement result; when the first measurement result is not lower than the first threshold, skip transmitting the sidelink synchronization signal block on the frequency corresponding to the first measurement result.

In an embodiment, the processor is further configured to select a synchronization reference and a synchronisation carrier frequency, where the synchronisation carrier frequency is one of a plurality of frequencies included in the first frequency set; the synchronization reference is related to the synchronisation carrier frequency; and the first frequency subset does not include the synchronisation carrier frequency, or the first frequency subset includes the synchronisation carrier frequency.

In an embodiment, the synchronization reference is used for all frequencies in a second frequency set; and the second frequency set includes the first frequency set.

In an embodiment, the first node is within coverage related to the synchronization reference on all the frequencies in the first frequency subset, or the first node is not within coverage related to the synchronization reference on any of the frequencies in the first frequency subset.

In an embodiment, the first threshold is a first candidate threshold or a second candidate threshold; and whether the first node is within coverage on the first frequency subset is used to determine the first threshold.

In an embodiment, when the first node is within the coverage on the first frequency subset, the first threshold is the first candidate threshold; when the first node is not within the coverage on the first frequency subset, the first threshold is the second candidate threshold.

In an embodiment, the plurality of measurement results are respectively a plurality of RSRP values.

In an embodiment, the processor 1010 may be a processor 1210. The first node 1000 may further include a transceiver 1230 and a memory 1220. Details are shown in FIG. 12.

FIG. 11 shows a second node used for wireless communication according to an embodiment of the present application. As shown in FIG. 11, the second node 1100 includes a third transmitter 1110.

The third transmitter 1110 may be configured to transmit first information, where the first information includes a second frequency set; the second frequency set is used by a first node to determine a first frequency set; the first frequency set includes a first frequency subset; a first parameter and a first threshold are used by the first node to determine whether to transmit a sidelink synchronization signal block on one or more frequencies in the first frequency set; the first parameter is determined based on a plurality of measurement results; and the plurality of measurement results are obtained via measurements respectively performed by the first node on all frequencies in the first frequency subset.

In an embodiment, a comparison result between the first parameter and the first threshold is used by the first node to determine whether to transmit the sidelink synchronization signal block on the one or more frequencies in the first frequency set; and the first parameter is one of: an average value of the plurality of measurement results; a minimum value of the plurality of measurement results; a maximum value of the plurality of measurement results; or a measurement result at a first position of the plurality of measurement results ranked in descending order or in ascending order according to values of the plurality of measurement results.

In an embodiment, the first parameter includes the plurality of measurement results; a first measurement result is one of the plurality of measurement results; and a comparison result between the first measurement result and the first threshold is used by the first node to determine whether to transmit the sidelink synchronization signal block on a frequency corresponding to the first measurement result.

In an embodiment, the first frequency set includes a synchronisation carrier frequency; a synchronization source on the synchronisation carrier frequency is selected by the first node as a synchronization reference; and the first frequency subset does not include the synchronisation carrier frequency, or the first frequency subset includes the synchronisation carrier frequency.

In an embodiment, the synchronization reference is used for all frequencies in the second frequency set; and the second frequency set includes the first frequency set.

In an embodiment, the first node is within coverage related to the synchronization reference on all the frequencies in the first frequency subset, or the first node is not within coverage related to the synchronization reference on any of the frequencies in the first frequency subset.

In an embodiment, the second node 1100 further includes a fourth transmitter that may be configured to transmit second information, where the second information includes a first candidate threshold and a second candidate threshold; the first threshold is the first candidate threshold or the second candidate threshold; and whether the first node is within coverage on the first frequency subset is used to determine the first threshold.

In an embodiment, when the first node is within the coverage on the first frequency subset, the first threshold is the first candidate threshold; when the first node is not within the coverage on the first frequency subset, the first threshold is the second candidate threshold.

In an embodiment, the plurality of measurement results are respectively a plurality of RSRP values.

The third transmitter 1110 may be a transceiver 1230. The second node 1100 may further include a processor 1210 and a memory 1220. Details are shown in FIG. 12.

FIG. 12 is a schematic structural diagram of a communications apparatus according to an embodiment of the present application. Dashed lines in FIG. 12 indicate that the unit or module is optional. The apparatus 1200 may be configured to implement the method described in the foregoing method embodiments. The apparatus 1200 may be a chip, a user equipment, or a network device.

The apparatus 1200 may include one or more processors 1210. The processor 1210 may support the apparatus 1200 in implementing the methods described in the foregoing method embodiments. The processor 1210 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 1200 may further include one or more memories 1220. The memory 1220 stores a program that may be executed by the processor 1210 to cause the processor 1210 to perform the methods described in the foregoing method embodiments. The memory 1220 may be independent of the processor 1210 or may be integrated into the processor 1210.

The apparatus 1200 may further include a transceiver 1230. The processor 1210 may communicate with another device or chip through the transceiver 1230. For example, the processor 1210 may transmit data to and receive data from another device or chip by using the transceiver 1230.

Figure 13:
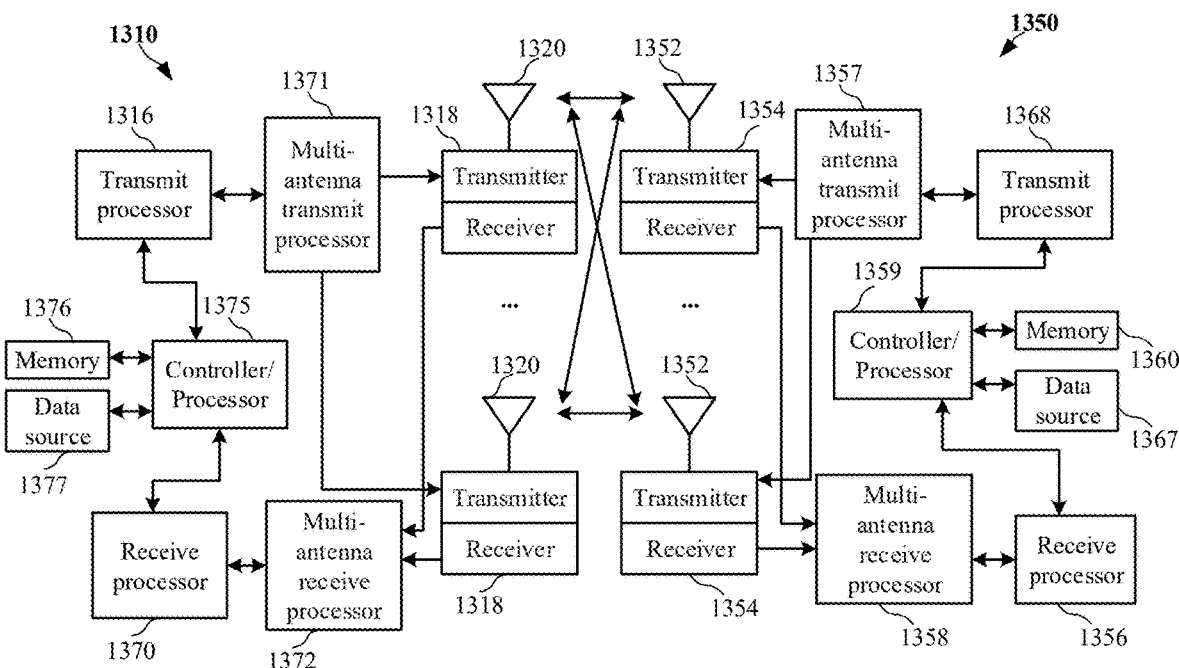
FIG. 13 is a schematic diagram of hardware modules of a communications device according to an embodiment of the present application.

FIG. 13 is a schematic diagram of hardware modules of a communications device according to an embodiment of the present application. Specifically, FIG. 13 is a block diagram of a first communications device 1350 and a second communications device 1310 communicating with each other in an access network.

The first communications device 1350 includes a controller/processor 1359, a memory 1360, a data source 1367, a transmit processor 1368, a receive processor 1356, a multi-antenna transmit processor 1357, a multi-antenna receive processor 1358, transmitters/receivers 1354, and antennas 1352.

The second communications device 1310 includes a controller/processor 1375, a memory 1376, a data source 1377, a receive processor 1370, a transmit processor 1316, a multi-antenna receive processor 1372, a multi-antenna transmit processor 1371, transmitters/receivers 1318, and antennas 1320.

During transmission from the second communications device 1310 to the first communications device 1350, at the second communications device 1310, an upper-layer data packet from a core network or an upper-layer data packet from the data source 1377 is provided to the controller/processor 1375. The core network and the data source 1377 represent all protocol layers above an L2 layer. The controller/processor 1375 implements a function of the L2 layer. During transmission from the second communications device 1310 to the first communications device 1350, the controller/processor 1375 provides header compression, encryption, packet segmentation and reordering, multiplexing between a logical channel and a transport channel, and allocation of radio resources of the first communications device 1350 based on various priority measures. The controller/processor 1375 is further responsible for retransmission of a lost packet, and signalling to the first communications device 1350. The transmit processor 1316 and the multi-antenna transmit processor 1371 implement various signal processing functions of an L1 layer (namely, a physical layer). The transmit processor 1316 implements encoding and interleaving to facilitate forward error correction at the second communications device 1310, and mapping of signal clusters based on various modulation schemes (such as binary phase shift keying, quadrature phase shift keying, M-phase shift keying, and M-quadrature amplitude modulation). The multi-antenna transmit processor 1371 performs digital space precoding, including codebook-based precoding and non-codebook-based precoding, on a coded and modulated symbol, and beamforming, to generate one or more spatial streams. The transmit processor 1316 then maps each spatial stream to a subcarrier, multiplexes the mapped spatial stream with a reference signal (for example, a pilot) in time domain and/or frequency domain, and then uses an inverse fast Fourier transform to generate a physical channel that carries a time-domain multi-carrier symbol stream. Subsequently, the multi-antenna transmit processor 1371 performs an operation of analog precoding transmitting/beamforming on the time-domain multi-carrier symbol stream. Each transmitter 1318 converts a baseband multi-carrier symbol stream provided by the multi-antenna transmit processor 1371 into a radio frequency stream, and then provides the radio frequency stream for different antennas 1320.

During transmission from the second communications device 1310 to the first communications device 1350, at the first communications device 1350, each receiver 1354 receives a signal through a corresponding antenna 1352 of the receiver 1354. Each receiver 1354 recovers information modulated onto a radio frequency carrier, converts a radio frequency stream into a baseband multi-carrier symbol stream, and provides the baseband multi-carrier symbol stream for the receive processor 1356. The receive processor 1356 and the multi-antenna receive processor 1358 implement various signal processing functions of the L1 layer. The multi-antenna receive processor 1358 performs an operation of analog precoding receiving/beamforming on the baseband multi-carrier symbol stream from the receiver 1354. The receive processor 1356 converts, from time domain to frequency domain via fast Fourier transform, the baseband multi-carrier symbol stream obtained after the operation of analog precoding receiving/beamforming. In frequency domain, a physical-layer data signal and a reference signal are demultiplexed by the receive processor 1356. The reference signal is used for channel estimation; and the data signal is recovered after multi-antenna detection performed by the multi-antenna receive processor 1358, to obtain any spatial stream that takes the first communications device 1350 as a destination. Symbols on each spatial stream are demodulated and recovered in the receive processor 1356, and a soft decision is generated. The receive processor 1356 then decodes and de-interleaves the soft decision to recover upper layer data and a control signal that are transmitted by the second communications device 1310 on a physical channel. The upper layer data and the control signal are then provided to the controller/processor 1359. The controller/processor 1359 implements a function of the L2 layer. The controller/processor 1359 may be associated with the memory 1360 that stores program code and data. The memory 1360 may be referred to as a computer-readable medium. During transmission from the second communications device 1310 to the first communications device 1350, the controller/processor 1359 provides multiplexing between a transport channel and a logical channel, packet reassembly, decryption, header decompression, and control signal processing, to recover an upper-layer data packet from the second communications device 1310. The upper-layer data packet is then provided to all protocol layers above the L2 layer, or various control signals may be provided to the L3 layer for processing by the L3 layer.

During transmission from the first communications device 1350 to the second communications device 1310, at the first communications device 1350, an upper-layer data packet is provided to the controller/processor 1359 by using the data source 1367. The data source 1367 represents all the protocol layers above the L2 layer. Similar to the transmit function, at the second communications device 1310, described during transmission from the second communications device 1310 to the first communications device 1350, the controller/processor 1359 implements header compression, encryption, packet segmentation and reordering, and multiplexing between a logical channel and a transport channel, to implement an L2 layer function for a user plane and a control plane. The controller/processor 1359 is further responsible for retransmission of a lost packet, and signalling to the second communications device 1310. The transmit processor 1368 performs modulation mapping and channel coding. The multi-antenna transmit processor 1357 performs digital multi-antenna space precoding, including codebook-based precoding and non-codebook-based precoding, and beamforming. Then, the transmit processor 1368 modulates a generated spatial stream into a multi-carrier/single-carrier symbol stream, and the multi-carrier/single-carrier symbol stream is provided to different antennas 1352 by using the transmitter 1354 after undergoing an analog precoding/beamforming operation in the multi-antenna transmit processor 1357. Each transmitter 1354 first converts a baseband symbol stream provided by the multi-antenna transmit processor 1357 into a radio frequency symbol stream, and then provides the radio frequency symbol stream for the antenna 1352.

During transmission from the first communications device 1350 to the second communications device 1310, a function at the second communications device 1310 is similar to the receive function at the first communications device 1350 described in transmission from the second communications device 1310 to the first communications device 1350. Each receiver 1318 receives a radio frequency signal through a corresponding antenna 1320 of the receiver 1318, converts the received radio frequency signal into a baseband signal, and provides the baseband signal for the multi-antenna receive processor 1372 and the receive processor 1370. The receive processor 1370 and the multi-antenna receive processor 1372 jointly implement functions of the L1 layer. The controller/processor 1375 implements functions of the L2 layer. The controller/processor 1375 may be associated with the memory 1376 that stores program code and data. The memory 1376 may be referred to as a computer-readable medium. During transmission from the first communications device 1350 to the second communications device 1310, the controller/processor 1375 provides multiplexing between a transport channel and a logical channel, packet reassembly, decryption, header decompression, and control signal processing, to recover an upper-layer data packet from the first communications device 1350. The upper-layer data packet from the controller/processor 1375 may be provided to the core network or all protocol layers above the L2 layer, or various control signals may be provided to the core network or the L3 layer for processing by the L3 layer.

In an embodiment, the first communications device 1350 includes: at least one processor and at least one memory. The at least one memory includes computer program code. The at least one memory and the computer program code are configured to be used together with the at least one processor. The first communications device 1350 is at least configured to: respectively perform measurements on all frequencies in a first frequency subset to obtain a plurality of measurement results, where a first parameter and a first threshold are used to determine whether to transmit a sidelink synchronization signal block on one or more frequencies in a first frequency set; the plurality of measurement results are used to determine the first parameter; and the first frequency subset belongs to the first frequency set.

In an embodiment, the first communications device 1350 includes: a memory for storing a computer-readable instruction program, where the computer-readable instruction program generates actions when being executed by at least one processor; and the actions include: respectively performing measurements on all frequencies in a first frequency subset to obtain a plurality of measurement results, where a first parameter and a first threshold are used to determine whether to transmit a sidelink synchronization signal block on one or more frequencies in a first frequency set; the plurality of measurement results are used to determine the first parameter; and the first frequency subset belongs to the first frequency set.

In an embodiment, the first communications device 1350 corresponds to a first node in the present application.

In an embodiment, the second communications device 1310 corresponds to a second node in the present application.

In an embodiment, the first communications device 1350 is a user equipment; and the user equipment may serve as a relay node.

In an embodiment, the first communications device 1350 is a user equipment supporting V2X; and the user equipment may serve as a relay node.

In an embodiment, the first communications device 1350 is a user equipment supporting D2D; and the user equipment may serve as a relay node.

In an embodiment, the first communications device 1350 is a network-controlled repeater NCR.

In an embodiment, the first communications device 1350 is a relay wireless repeater.

In an embodiment, the first communications device 1350 is a relay.

In an embodiment, the second communications device 1310 is a base station.

In an embodiment, the antenna 1352, the receiver 1354, the multi-antenna receive processor 1358, the receive processor 1356, and the controller/processor 1359 are configured to respectively perform measurements on all frequencies in a first frequency subset to obtain a plurality of measurement results.

In an embodiment, the antenna 1320, the transmitter 1318, the multi-antenna transmit processor 1371, the transmit processor 1316, and the controller/processor 1375 are configured to transmit first information in the present application.

An embodiment of the present application further provides a computer-readable storage medium for storing a program. The computer-readable storage medium may be applied to a terminal or a network device provided in embodiments of the present application; and the program causes a computer to perform the methods to be performed by the terminal or the network device in various embodiments of the present application.

An embodiment of the present application further provides a computer program product. The computer program product includes a program. The computer program product may be applied to the terminal or the network device provided in embodiments of the present application; and the program causes a computer to perform the methods to be performed by the terminal or the network device in various embodiments of the present application.

An embodiment of the present application further provides a computer program. The computer program may be applied to the terminal or the network device provided in embodiments of the present application; and the computer program causes a computer to perform the methods to be performed by the terminal or the network device in various embodiments of the present application.

It should be understood that the terms "system" and "network" in the present application may be used interchangeably. In addition, the terms used in the present application are merely used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include", "have", and any variations thereof are intended to cover a non-exclusive inclusion.

In embodiments of the present application, "indicate" mentioned herein may refer to a direct indication, or may refer to an indirect indication, or may mean that there is an association relationship. For example, if A indicates B, it may mean that A directly indicates B, for example, B may be obtained from A. Alternatively, it may mean that A indirectly indicates B, for example, A indicates C, and B may be obtained from C. Alternatively, it may mean that there is an association relationship between A and B.

In embodiments of the present application, "B corresponding to A" means that B is associated with A, and B may be determined based on A. However, it should be further understood that, determining B based on A does not mean determining B based only on A, but instead, B may be determined based on A and/or other information.

In embodiments of the present application, the term "corresponding" may mean that there is a direct or indirect correspondence between two elements, or that there is an association relationship between two elements, or that there is a relationship of "indicating" and "being indicated", "configuring" and "being configured", or the like.

In embodiments of the present application, "pre-definition" or "pre-configuration" may be implemented by pre-storing corresponding code, tables, or other forms that may be used to indicate related information in devices (for example, including a user equipment and a network device), and a specific implementation thereof is not limited in the present application. For example, being pre-defined may refer to being defined in a protocol.

In embodiments of the present application, the "protocol" may refer to a standard protocol in the communications field, and may include, for example, an LTE protocol, an NR protocol, and a related protocol applied to a future communications system, which is not limited in the present application.

In embodiments of the present application, the term "and/or" is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects.

In embodiments of the present application, sequence numbers of the foregoing processes do not mean execution orders. The execution orders of the processes should be determined according to functions and internal logic of the processes, and should not be construed as any limitation on the implementation processes of embodiments of the present application.

In several embodiments provided in the present application, it should be understood that, the disclosed system, apparatus, and method may be implemented in other manners. For example, the described apparatus embodiments are merely examples. For example, unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented as indirect couplings or communication connections via some interfaces, apparatuses or units, and may be implemented in electronic, mechanical, or other forms.

Units described as separate components may be or may not be physically separate, and components displayed as units may be or may not be physical units, that is, may be located in one position, or distributed on a plurality of network units. Some or all of the units may be selected according to actual needs to achieve the objective of solutions of embodiments.

In addition, functional units in embodiments of the present application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (for example, a coaxial cable, an optical fiber, and a digital subscriber line (DSL)) manner or a wireless (for example, infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid state drive (SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method, comprising:
performing, by a first node, measurement on a first frequency to obtain a first reference signal received power (RSRP) value, wherein the first frequency is a frequency in a first frequency subset in a first frequency set, the first frequency subset does not include one or more synchronisation carrier frequency in the first frequency set, the first frequency set comprises one or more frequencies for synchronization;
when the first RSRP value is lower than a first threshold, transmitting a sidelink synchronisation signal/physical sidelink broadcast channel block (S-SSB) on the first frequency that is not a synchronisation carrier frequency.

2. The method of claim 1, further comprising:
when the first RSRP value is not lower than the first threshold, refraining from transmitting the S-SSB on the first frequency.

3. The method of claim 1, further comprising:
selecting a synchronisation reference and a synchronisation carrier frequency,
wherein a measurement result on the synchronisation carrier frequency is used for synchronisation on the one or more frequencies in the first frequency subset, and the synchronisation reference corresponds to the synchronisation carrier frequency.

4. The method of claim 3, wherein the synchronisation carrier frequency is selected from frequencies in the first frequency set, and the synchronisation carrier frequency is used by the first node to determine the synchronisation reference.

5. The method of claim 3, wherein a synchronisation source on the synchronisation carrier frequency is selected by the first node as a synchronisation reference.

6. The method of claim 3, wherein the synchronisation reference comprises at least one of a global navigation satellite system (GNSS), a base station, or a synchronisation reference user (SyncRef UE).

7. The method of claim 3, wherein the synchronisation reference is used for frequencies in a second frequency set, the second frequency set comprises the first frequency set, the second frequency set is configured by a high layer as a set of frequencies for synchronisation, and the first frequency set is a set of currently aggregated frequencies for synchronisation.

8. The method of claim 3, wherein the first node is in a coverage of the synchronization reference on all frequencies in the first frequency subset, and the first RSRP value is a RSRP measurement result of a serving cell of the first node.

9. The method of claim 3, wherein the first node is out of coverage of the synchronization reference on any frequency in the first frequency subset, and the first RSRP value is a RSRP measurement result of a S-SSB sent by a SyncRef UE.

10. The method of claim 1, wherein the first threshold is a first candidate threshold or a second candidate threshold, and the first threshold is determined by whether the first node is in a coverage on the first frequency subset.

11. The method of claim 10, wherein the first threshold is the first candidate threshold when the first node is in the coverage on the first frequency subset, or the first threshold is the second candidate threshold when the first node is out of the coverage on the first frequency subset, wherein the first candidate threshold is syncTxThreshIC, and the second candidate threshold is syncTxThreshOoC.

12. The method of claim 1, wherein a plurality of RSRP values obtained from measurement at a plurality of frequencies in the first frequency subset are respectively used to determine whether to send a S-SSB at a corresponding frequency in the first frequency subset.

13. A first node, comprising:
at least one processor; and
one or more memories coupled to the at least one processor and storing programming instructions for execution by the at least one processor to cause the first node to perform operations comprising:
performing measurement on a first frequency to obtain a first reference signal received power (RSRP) value, wherein the first frequency is a frequency in a first frequency subset in a first frequency set, the first frequency subset does not include one or more synchronisation carrier frequency in the first frequency set, the first frequency set comprises one or more frequencies for synchronisation;
when the first RSRP value is lower than a first threshold, transmitting a sidelink synchronisation signal/physical sidelink broadcast channel block (S-SSB) on the first frequency that is not a synchronisation carrier frequency.

14. The first node of claim 13, the operations further comprising:
when the first RSRP value is not lower than the first threshold, refraining from transmitting the S-SSB on the first frequency.

15. The first node of claim 13, the operations further comprising:
selecting a synchronisation reference and a synchronisation carrier frequency, wherein a measurement result on the synchronisation carrier frequency is used for synchronisation on the one or more frequencies in the first frequency subset, and the synchronisation reference corresponds to the synchronisation carrier frequency.

16. The first node of claim 15, wherein the synchronisation carrier frequency is selected from frequencies in the first frequency set, and the synchronisation carrier frequency is used by the first node to determine the synchronisation reference.

17. The first node of claim 15, wherein a synchronisation source on the synchronisation carrier frequency is selected by the first node as a synchronisation reference.

18. The first node of claim 15, wherein the synchronisation reference comprises at least one of a global navigation satellite system (GNSS), a base station, or a synchronisation reference user (SyncRef UE).

19. The first node of claim 15, wherein the synchronisation reference is used for frequencies in a second frequency set, the second frequency set comprises the first frequency set, the second frequency set is configured by a high layer as a set of frequencies for synchronisation, and the first frequency set is a set of currently aggregated frequencies for synchronisation.

20. A method, comprising:

transmitting first information, wherein the first information comprises a second frequency set, the second frequency set is used to determine a first frequency set, and the first frequency set comprises a first frequency subset, wherein a first reference signal received power (RSRP) value and a first threshold are used to determine whether to transmit a sidelink synchronisation signal/physical sidelink broadcast channel block (S-SSB), the first RSRP value is a measurement result on a first frequency that is not a synchronisation carrier frequency and that is in the first frequency subset in the first frequency set, the first frequency subset does not include one or more synchronisation carrier frequency in the first frequency set, the first frequency set comprises one or more frequencies for synchronization.

* * * * *